United States Patent
Hein et al.

(10) Patent No.: US 9,812,938 B2
(45) Date of Patent: Nov. 7, 2017

(54) MAGNETIC DEVICE COMPRISING AN ACCELERATION UNIT ACTING ON THE TRANSLATOR

(71) Applicant: SEH Limited, Mriehel (MT)

(72) Inventors: Jeremy Hein, Monaco (MC); Martin Marschner Von Helmreich, Monaco (MC)

(73) Assignee: SEH LIMITED, Mriehel (MT)

( * ) Notice: Subject to any disclaimer, the term of this patent is extended or adjusted under 35 U.S.C. 154(b) by 313 days.

(21) Appl. No.: 14/654,677

(22) PCT Filed: Dec. 23, 2013

(86) PCT No.: PCT/EP2013/077888
§ 371 (c)(1),
(2) Date: Jun. 22, 2015

(87) PCT Pub. No.: WO2014/096444
PCT Pub. Date: Jun. 26, 2014

(65) Prior Publication Data
US 2015/0340145 A1    Nov. 26, 2015

(30) Foreign Application Priority Data

Dec. 21, 2012    (AT) ................. A 1334/2012

(51) Int. Cl.
*H02K 33/16*    (2006.01)
*H01F 7/20*    (2006.01)
(Continued)

(52) U.S. Cl.
CPC .......... *H02K 33/16* (2013.01); *H01F 7/0242* (2013.01); *H01F 7/064* (2013.01); *H01F 7/206* (2013.01);
(Continued)

(58) Field of Classification Search
CPC .... H02K 41/02; H02K 33/16; H02K 2201/03; H02K 2213/03; H02K 2213/09;
(Continued)

(56) References Cited

U.S. PATENT DOCUMENTS

| 8,222,754 | B1 | 7/2012 | Soliman et al. |
| 2002/0101125 | A1* | 8/2002 | Ibuki ................. H02P 25/032 310/114 |

(Continued)

FOREIGN PATENT DOCUMENTS

| DE | 10003928 A1 | 6/2001 |
| DE | 102006013013 A1 | 10/2007 |

(Continued)

OTHER PUBLICATIONS

English translation of International Preliminary Report on Patentability dated Nov. 26, 2015 in International Application No. PCT/EP2013/077888.

(Continued)

*Primary Examiner* — Mohamad Musleh
(74) *Attorney, Agent, or Firm* — Panitch Schwarze Belisario & Nadel LLP

(57) ABSTRACT

A magnetic device comprising at least one stator (1) and one translator (2), which translator (2) is movable along a translator movement path (3) in a translator movement direction (4) relative to the Stator (1),
the translator (2) being coupled, at least in portions of the translator movement path (3), to an acceleration unit (5), which on coupling the translator (2) with the acceleration unit (5) generates an acceleration force state comprising at least a corrective force $F_{corr}$ acting on the translator (2), which acceleration force state can cause a movement of the translator (2) away from the stator (1), wherein
when the translator (2) is coupled to the acceleration unit (5) and the translator (2) moves away from the stator (1), the (Continued)

sum total of the forces acting on the translator (2) in the translator movement direction (4) due to magnetism is greater than or equal to zero,
so that the translator (2) can be separated from the attractive force generated by the stator (1) by means of the corrective force $F_{corr}$.

13 Claims, 20 Drawing Sheets

(51) Int. Cl.
*H01F 7/02* (2006.01)
*H01F 7/06* (2006.01)
*H01F 7/16* (2006.01)
*H02P 25/032* (2016.01)

(52) U.S. Cl.
CPC ...... *H01F 7/1646* (2013.01); *H01F 2007/208* (2013.01); *H02K 2201/03* (2013.01); *H02K 2213/03* (2013.01); *H02K 2213/09* (2013.01); *H02P 25/032* (2016.02)

(58) Field of Classification Search
CPC ........ H01F 7/206; H01F 7/0242; H01F 7/064; H01F 7/1646; H01F 2007/208; H02P 25/032
See application file for complete search history.

(56) References Cited

U.S. PATENT DOCUMENTS

| | | | |
|---|---|---|---|
| 2007/0085425 A1* | 4/2007 | Hirashima | H02K 33/16 310/15 |
| 2008/0001484 A1* | 1/2008 | Fuller | H02K 33/16 310/15 |

FOREIGN PATENT DOCUMENTS

| | | |
|---|---|---|
| DE | 102007051917 A1 | 5/2008 |
| EP | 1320178 A1 | 6/2003 |
| EP | 1995090 A2 | 11/2008 |
| WO | 2007063222 A1 | 6/2007 |

OTHER PUBLICATIONS

Search Report dated Apr. 11, 2013 in AT Application No. A 1334/2012.
International Search Report and Written Opinion dated Jul. 11, 2014 in International Application No. PCT/EP2013/077888.
International Preliminary Report on Patentability dated Apr. 14, 2015 in International Application No. PCT/EP2013/077888.

* cited by examiner

Interaction force [N]
$$J_{coil} = 0 \; [\tfrac{A}{mm^2}]$$

MAGNETIC DEVICE COMPRISING AN ACCELERATION UNIT ACTING ON THE TRANSLATOR

CROSS-REFERENCE TO RELATED APPLICATION

This application is a Section 371 of International Application No. PCT/EP2013/077888, filed Dec. 23, 2013, which was published in the German language on Jun. 26, 2014, under International Publication No. WO 2014/096444 A2, and the disclosure of which is incorporated herein by reference.

The present invention relates to a magnetic device comprising at least one stator and one translator, which translator is movable along a translator movement path in a translator movement direction relative to the stator, the translator being coupled, at least in portions of the translator movement path, to an acceleration unit, which on coupling the translator with the acceleration unit generates an acceleration force state comprising at least a corrective force $F_{corr}$ acting on the translator, which acceleration force state can cause a movement of the translator away from the stator.

For reasons of simplification, below the stator magnet will be referred to as stator, and the translator magnet will be referred to as translator.

Magnetic drives according to the state of the art comprise at least one stator and one translator, which translator is movable relative to the stator by using the magnetic attractive and repulsive forces acting between the stator and the translator. From AT20110001260201109 05 (Applicants: Jeremy Hein, Martin Marschner von Helmreich) it is known that the attractive and repulsive forces are essentially a function of the distance between stator and translator. The total sum of all forces acting on the translator and causing the translator to move may be optimized by setting the distance between the translator and the closer stator.

The state of force caused by the magnetic attractive forces and acting on the translator can reach its maximum on the translator moving towards the stator at a distance r from the stator. In case of the opposite movement direction of the translator, i.e. when the translator moves away from the stator, attractive forces may be active between the stator and the moving translator when the distance r is sufficiently small.

In case of a sufficiently small distance between stator and translator, the stator and the translator act, irrespectively of the polarity of the stator and the translator, as magnets. The sufficiently small distance is, among other things, determined by the field strength of the translator with regard to the stator or conversely. The field strength of the translator can be low compared to the stator during operation of a magnetic device, for example during polarity reversal of an electromagnet.

In case of a sufficiently small distance between stator and translator, movement of the translator away from the stator is prevented or decelerated by the attractive forces between the stator and the translator. This effect known in the state of the art is called "capturing" the translator at the stator. This reduces the output of a magnetic device that serves as, for example, a magnetic drive.

DE102997051917 discloses a magnetic device comprising an actuator provided in the form of an electromagnet and a spring element for generating a force in the direction of movement. DE102997051917, however, does not mention the problem discussed in the present disclosure regarding the effects of the stator and the translator, at least when the translator is moved close enough to the stator. Thus, a skilled person would not try to create an inventive state of equilibrium of forces or state of disequilibrium of forces as described below. DE102997051917 does not contain any specifications regarding the magnitude of the force to be produced in the direction of movement, thus a skilled person is not able to deduce the magnitude of the spring force from DE102997051917.

Likewise, EP1320178 does not contain any specifications regarding a spring acting in addition to an electromagnetic linear drive. The problem of the stator and the translator acting as magnets when the translator is moved sufficiently close to the stator is also not discussed in EP1320178, thus a skilled person is not able to deduce the effect of the spring force from EP1320178.

DE10003928 discloses an electromagnetic actuator with a spring mechanism acting on the translator. According to the disclosure of DE10003928, the spring mechanism serves as a back-swing mechanism of the translator. The problem behind the present invention of separating the translator from the stator when the translator moves away from the stator is not discussed in DE10003928.

In WO2007063222 the spring serves to move the actuator to a closed position in the event of a coil failing. The problem of the invention is not treated in WO2007063222.

The spring in the device disclosed in DE202009014192 has no effect on the movement of the translator but serves for coupling several devices.

The invention discussed herein tries to solve the problem of providing a magnetic device that, compared to devices according to the state of the art, comprises an additional component for reducing or preventing the effect of capturing the translator at the stator. In the following, the state of force caused by the capturing effect is called "capturing force state".

According to the invention this is achieved by the fact that when the translator is coupled to the acceleration unit and the translator moves away from the stator, the sum total of the forces acting on the translator in the translator movement direction due to magnetism is greater than or equal to zero, so that the translator can be separated from the attractive force generated by the stator by means of the corrective force $F_{corr}$.

The inventive magnetic device can be a magnetic drive, a generator, a resistive element or any other device in which a translator is moved with respect to the stator, mainly or also only partly due to forces generated by magnetic fields.

If the distance between the translator and the stator is sufficiently small, the stator and the translator act as magnets, so that the translator is moved towards the stator. The acceleration force state caused by the acceleration unit is oriented in a movement direction of the translator away from the stator. The effect of the acceleration force state can be limited to the portion of the translator movement path in which the capturing effect described above occurs.

In portions of the translator movement path, the acceleration force state can be superposed by the capturing force state. The capturing force state is basically characterized by the attractive forces acting between the stator and the translator. The acceleration force state acts, depending on its magnitude, completely or partly against the capturing force state.

The acceleration unit can generate the force state on the basis of mechanically generated forces or magnetic forces. The acceleration unit can generate the acceleration force state by means of a previous deformation of an at least partially elastically deformed body. The deformation of the elastic body can be caused by a movement of the translator. Usually, the deformation of the elastic body is caused during a movement of the translator at least partially towards the stator before the capturing effect occurs and/or before the translator reaches a region sufficiently close to the stator where the capturing effect occurs subsequently.

One embodiment of the inventive magnetic device may be characterized by the acceleration unit being operatively coupled to the translator along the entire translator movement path.

Depending on the distance between the translator and the stator, the acceleration unit may be biasable when the translator approaches the stator and/or the acceleration unit may, depending on the distance between the translator and the stator, cause the acceleration force state.

When the translator is coupled to the acceleration unit and the translator moves towards the stator, the sum total of the forces acting on the translator in the direction opposite to the translator movement direction can be smaller than or equal to zero.

The inventive magnetic device disclosed herein is not limited to positioning the acceleration unit in a region between the stator and the translator. Positioning of the acceleration unit in this region merely constitutes one possibility of the inventive positioning of the acceleration unit. The acceleration unit can also be arranged laterally with regard to the translator movement path and extend in any angle to the translator movement path.

The spring can also be formed integrally with a bearing element, which serves for bearing the translator sliding on a translator axis. The spring can be provided as a leaf spring or a coil spring. The bearing element can comprise an elastic material, which elastic material is deformed during operation of the inventive magnetic device.

According to the state of the art, the force acting on a translator is the sum total of stators and translators active in this area and depends on the distance between the respective stator and translator. The capturing force, which occurs with the capturing effect described above when the translator moves away from the stator, acts analogously when the spring is formed correspondingly. The invention disclosed herein can be characterized by the acceleration unit generating the acceleration force state depending on the temporary distance between the translator and the stator.

The above characteristic of the acceleration unit can, for example, be achieved by means of a spring with different geometric shapes along the spring length or by means of different material properties of the spring along the spring length. In an analogous manner, for example, an elastically deformable body is to be provided.

The following embodiment of the inventive magnetic device can be advantageous when the acceleration unit is biased dependent on the translator approaching the stator. In the context of the discussion of the present invention a bias describes, similar to the bias of a spring, a condition in which the acceleration unit stores a force or distortion supplied to an acceleration unit for later release. According to the invention, the later release of the supplied force or distortion serves for separating the translator captured at the stator.

One possible embodiment of the inventive magnetic device can be characterized by the acceleration unit being coupled to the translator as well as a fixed point and extending at least partially between the translator and the fixed point.

The fixed point can be an object positioned outside the inventive device. The fixed point can also be a device part, such as a framework or housing part. The fixed point can be stationary or slidable with respect to the stator.

The stator can be the fixed point.

The acceleration unit can be a further magnet, which is coupled to the translator and is switched in for acceleration the translator. The further magnet can be a permanent magnet and/or an electromagnet.

In addition to this the acceleration unit can be a driving unit, which is coupled to the translator. The driving unit may be formed as an pneumatic device and/or hydraulic device and/or an electric motor.

The acceleration unit can be provided in the form of a spring, which spring has a spring force component acing in parallel with the translator movement direction.

The spring force component thus acts opposite to the forced caused by the capturing effect. The spring is biased by the movement of the translator towards the stator, wherein the force stored within the spring is released during the movement of the translator away from the stator.

The above description relates to a linear as well as a polygonal translator movement path. One line of the translator movement path can run through the stator.

Possible embodiments of the inventive magnetic device comprise any possible combination of electromagnets, in particular the provision of the stator and the translator in the form of permanent magnets or electromagnets.

The stator and the translator can both be provided in the form of permanent magnets.

The stator can be a permanent magnet, and the translator can be an electromagnet.

The stator can be an electromagnet, and the translator can be an electromagnet.

According to general expertise, the electromagnets and/or the permanent magnets have to be polarized so that a movement or a defined position of the translator with respect to the stator can be achieved by means of generated repulsive or attractive forces.

When the stator and/or the translator are provided in the form of electromagnets, the stator and/or the translator can act as additional magnets. This can be achieved by changing the magnetic field of the stator and/or the translator in the course of a defined period of time. The defined period of time can be chosen depending on the position of the moving translator.

The inventive magnetic device can comprise a control device for controlling the polarization of the electromagnet and for controlling the strength of the electromagnet depending on the acceleration force state.

Below, the effect of an acceleration unit as part of the inventive magnetic device will be described with reference to the following figures and the corresponding description of the figures complementing the above description.

In the figures, the following elements are identified by the following reference numbers:
 1 stator
 2 translator
 3 translator movement path
 4 translator movement direction
 5 acceleration unit
 6 fixed point
 7 spring FIGS. 1 to 16 relate to a magnetic device comprising one stator and one translator.

FIGS. 17 to 27 relate to a magnetic device comprising one stator and two translators.

Furthermore, for reasons of simplification as they are generally known to persons skilled in the art and applied with respect to state of the art, the following discussion does not take into account forces counteracting a movement of the translator, such as frictional forces or air resistance.

With reference to FIGS. 1 to 16, the interaction of two magnetic dipoles arranged along a linear translator movement path 3 is discussed. The first dipole 1 is an electromagnet, the second dipole 2 is a permanent magnet. The discussion with reference to FIGS. 1 to 17 is based on the assumption that there is no relative movement between the dipoles so that designating the dipoles as stator or translator is irrelevant.

For reasons of simplification according to the state of the art, a permanent magnet is assumed to have a cylindrical shape and a magnetic field extending at least along the translator movement axis. Furthermore, a uniform magnetization $\vec{M}_1 = M_1 \vec{e}_x$ of the magnetic field in amperes per meter [A/m] is assumed. The magnetic field outside of the permanent magnet decreased with increasing distance x from the magnet. This can be expressed by the following formula:

$$f(0)=1$$

$$H_1(x)=M_1 \times f(x)e_x \text{ [A/m] with}$$

$$\lim_{\infty} f(x)=0$$

The electromagnet comprises a cylindrical ferromagnetic core, around which a coil extends in a likewise cylindrical shape. For reasons of simplification, a uniform magnetization of the ferromagnetic core is assumed when an external magnetic field $H_{coil}(J)$ [A/m] is used, so that the following relation is satisfied: $M_{core}(H)=\chi_v \times \vec{vecH}$ with $\chi_v$ being the magnetic susceptibility of the ferromagnetic core. When a current I runs through the windings of the electromagnet, a magnetic field $H_{coil}(J)$ is generated in the coil interior as a function of J [A/m] as current density within the winding of the coil.

Correspondingly, for the magnetic field of the ferromagnetic core of the electromagnet resulting from the current density J the following applies: $M_{EM}^{(1)}(x)=\chi_v \times H_1(x)e_x=\chi_v \times M_1 \times f(x)e_x$ [A/m]. According to relevant teachings, the maximum of the additional magnetic field with x=0 is: $M_{EM}^{(1)}(0)=\chi_v \times H_1(0)e_x=\chi_v \times M_1 \times e_x$.

Consequently, the strength of the magnetic field of the ferromagnetic core is determined by the sum of the magnetic field generated by the permanent magnet at a distance x and the magnetic field generated by the coil to which the current density J is applied:

$$M_{EM}(x,J)=M_{EM}^{(1)}(x)+M_{EM}^{(coil)}(j)=\chi_v\{H_{coil}(j)+H_1(x)\}e_x=\chi_v\{H_{coil}(J)+M_1\times f(x)\}e_x.$$

Regarding the interaction forces between the permanent magnet and the electromagnet, the following two basic cases (Case 1, Case 2) are to be considered. The magnetizations of the permanent magnet and the electromagnet deduced in FIGS. 2 to 5 are derived from the basic cases below.

Case 1: The permanent magnet and the core are magnetized in the same direction, i.e. the following applies:

$$\forall x, \forall J, M_{EM}(x,J)=M_{EM}(x,J)e_x, M_{EM}(x,J)>0$$

$\forall x$, $M_1(x)=M_1(x)e_x$, $M_1(x)>0$, wherein the sides of the permanent magnet facing each other and the core have different polarities. The resulting force is an attractive force with $F_1(x)=F_1(x)e_x, F_1(x)<0$.

Case 2: The permanent magnet and the core are magnetized in different directions, i.e. the following applies:

$$\forall x, \forall J, M_{EM}(x,J)=M_{EM}(x,J)e_x, M_{EM}(x,J)<0$$

$\forall x$, $M_1(x)=M_1(x)e_x$, $M_1(x)<0$, wherein the sides of the permanent magnet facing each other and of core have the same polarities. The resulting force is a repulsive force with $F_1(x)=F_1(x)e_x, F_1(x)>0$.

A "positive" magnetization of the core creates an attractive force, which implies $H_{coil}(J)>-H_1(x)$. With a current density $J_1$ satisfying $\forall x, H_{coil}(J)=-H_1(x)$ an attractive force occurs with $J>J_1$.

A "negative" magnetization of the core creates a repulsive force, which implies $H_{coil}(J)<-H_1(x)$ and $J<J_1$.

In case no current is supplied to the coil, an attractive interaction occurs because $H_{coil}(0)=-H_1(x)$ due to the "positive" magnetization of the core.

When the magnetic field of the core is stronger than the magnetic field and opposed thereto, a repulsive interaction occurs. This satisfies $H_{coil}(J)<-H_1(x)$ and $J<J_1$.

FIG. 1 illustrates the case of an attractive interaction between the permanent magnet (first dipole 1) and the electromagnet (second dipole 2). No current is supplied to the electromagnet. The core is magnetized by the magnetic field at a distance x and is thus attracted by the permanent magnet.

FIG. 2 illustrates the case of an attractive interaction between the permanent magnet (first dipole 1) and the electromagnet (second dipole 2), which is supplied with a "positive" current intensity. Supplying with a "positive" current density means that the magnetic field of the coil and the magnetic field are oriented in the same direction.

The magnetic field of the coil and of the core lead to a higher magnetization of the core, which means that the attractive force generally increases with rising current density.

Figure 1:
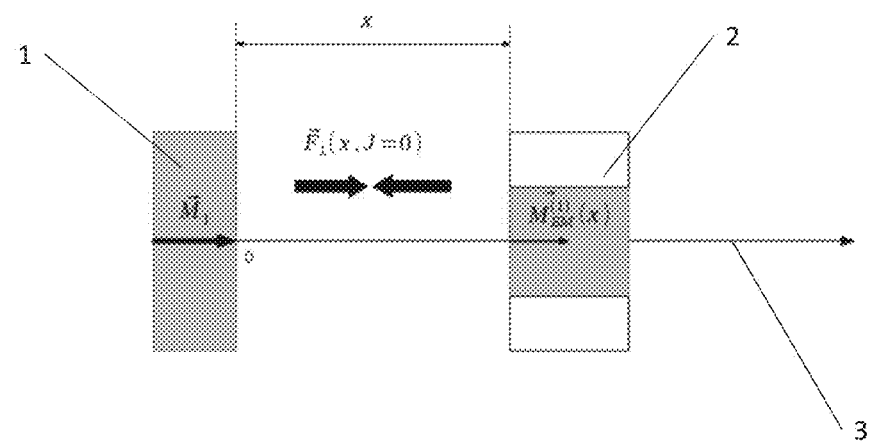
Figure 2:
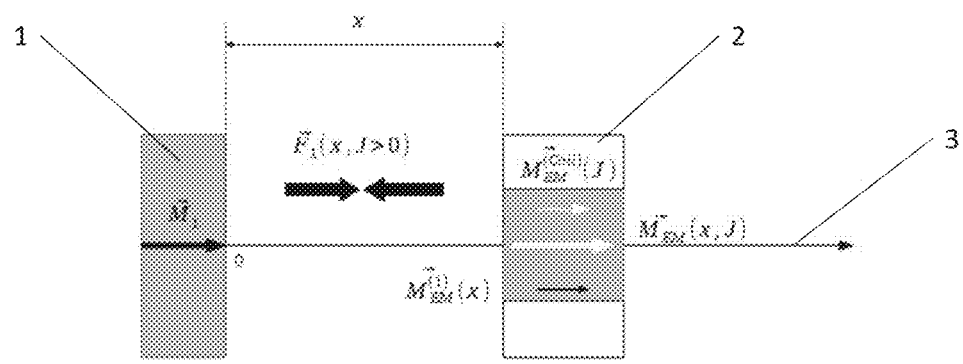
Figure 3:
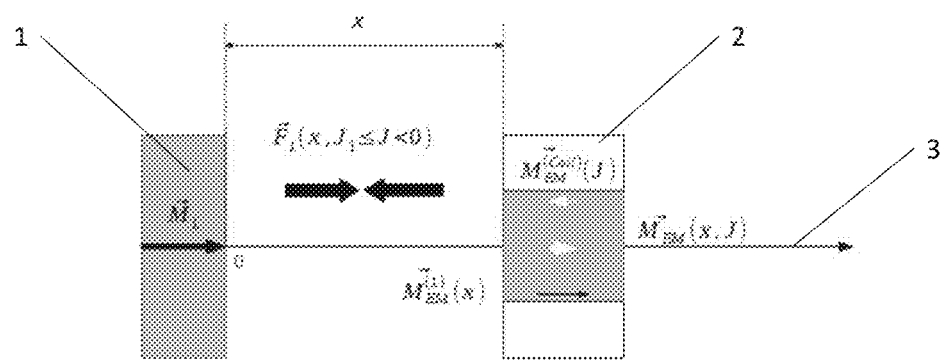
FIG. 3 shows the attractive interaction between the permanent magnet (first dipole 1) and the electromagnet (second dipole 2) for the case of supply with a "negative" current intensity, so that the magnetic field of the coil and the magnetic field are oriented in opposite directions. When $-H_1(x)<H_{coil}(J)<0 \Rightarrow J_1<J<0$ is satisfied, the interaction is an attractive interaction.
Figure 4:
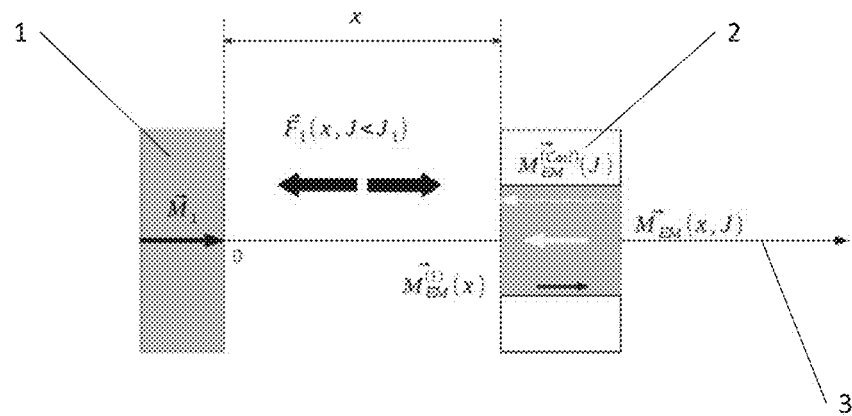
FIG. 4 shows the case of a repulsive interaction between the permanent magnet 1 and the electromagnet 2 in case of supply with a "negative" current density, so that $H_{coil}(J)<-H_{1(x)}$ or $J<J_1$ is satisfied. A repulsive interaction occurs when the magnetic field strength of the electromagnet is higher than the magnetic field strength and oriented in the opposite direction.
Figure 5:
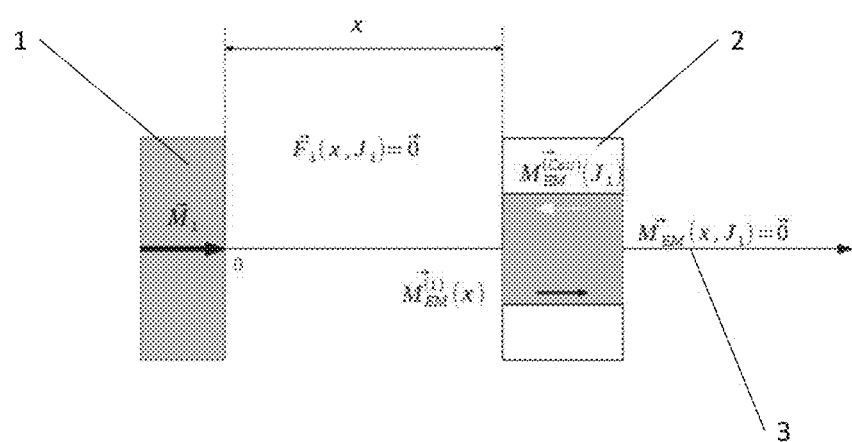

FIG. 5 shows the case of a compensation of the magnetic field by the permanent magnet 1 by means of a magnetic field generated by the coil. This is generated by the use of an inventive magnetic device. This special case is characterized by the fact that there is no magnetization of the core of the electromagnet and thus no interaction forces resulting from interactions. The opposite polarities of the electromagnet cancel each other out.

This equilibrium is characterized by no interaction force $F_1(x,J_1)=0$, which is achieved with $H_{coil}(J)=-M_1(x)$ or $J=J_1$.

Figure 6:
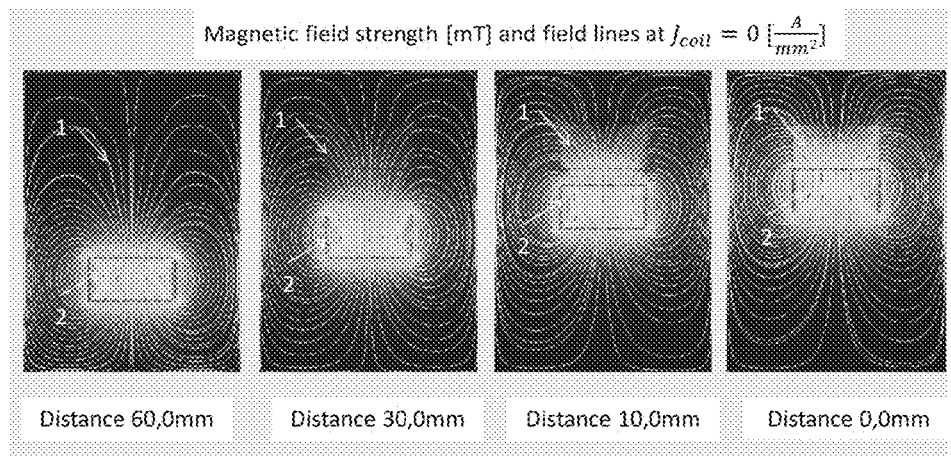

FIG. 6 shows the result of an FEM simulation. In FIG. 5, the magnetic field strengths (‖B‖[mT]) and the magnetic field lines are shown for a case in which the coil is not supplied with any current. In FIG. 6, the translator is shown at a distance of 60.0 mm, 30.0 mm, 10.0 mm and 0.0 mm (contact between permanent magnet and electromagnet).

The permanent magnet 1 magnetizes the core of the electromagnet 2, which leads to an attractive interaction force, which attractive interaction force is inversely proportional to the distance x. The larger the distance, the smaller is the attractive interaction force.

Figure 7:
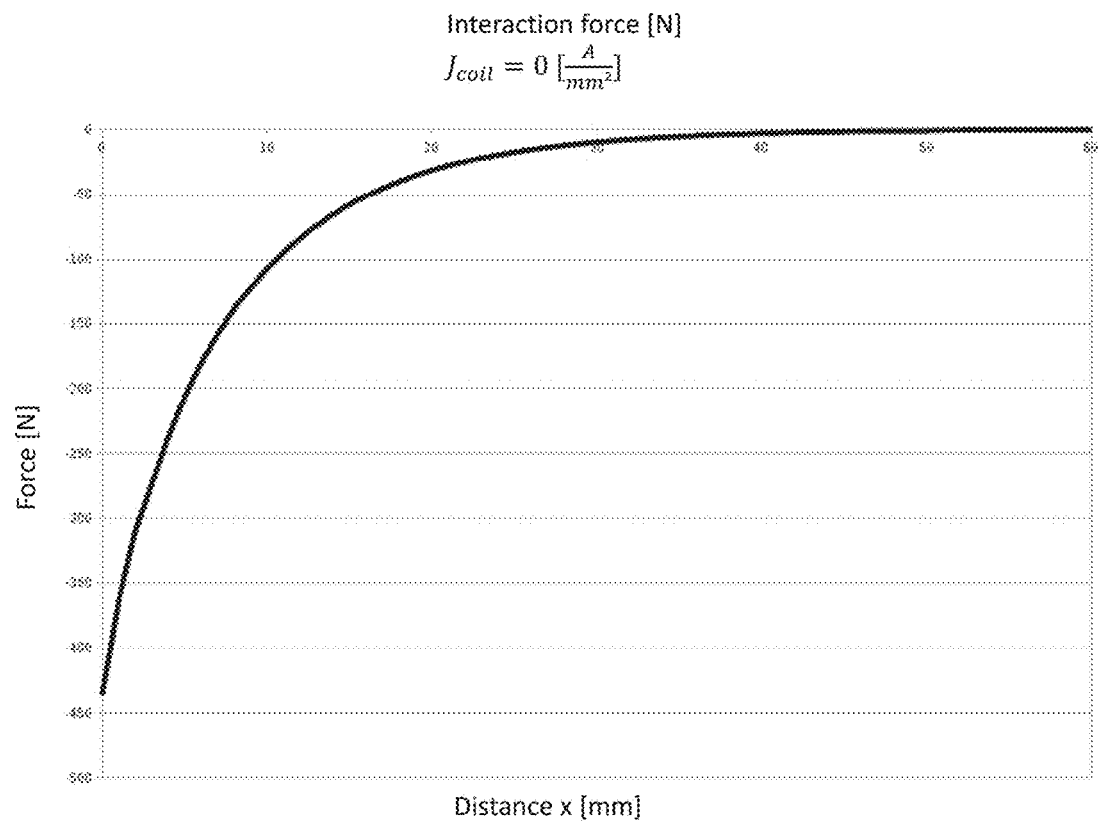

FIG. 7 is a diagram showing the results of the FEM simulation from FIG. 6. The abscissa shows the distance x, while the ordinate shows the force.

Figure 8:
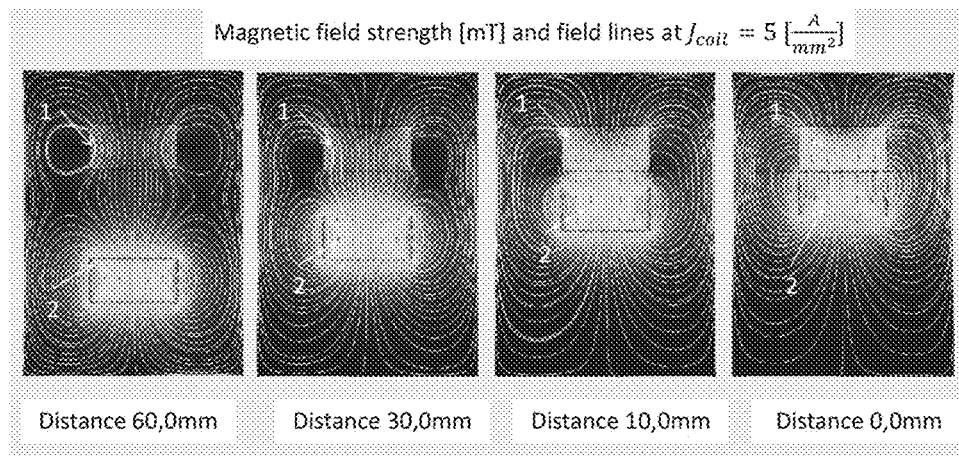

In analogy to FIG. 6, FIG. 8 shows the results of a FEM simulation when the coil is supplied with a current density of $$J_{coil} = 5\left[\frac{A}{mm^2}\right].$$

The permanent magnet 1 and the electromagnet 2 are polarized in the same direction, so that a larger attractive interaction force is generated.

Figure 9:
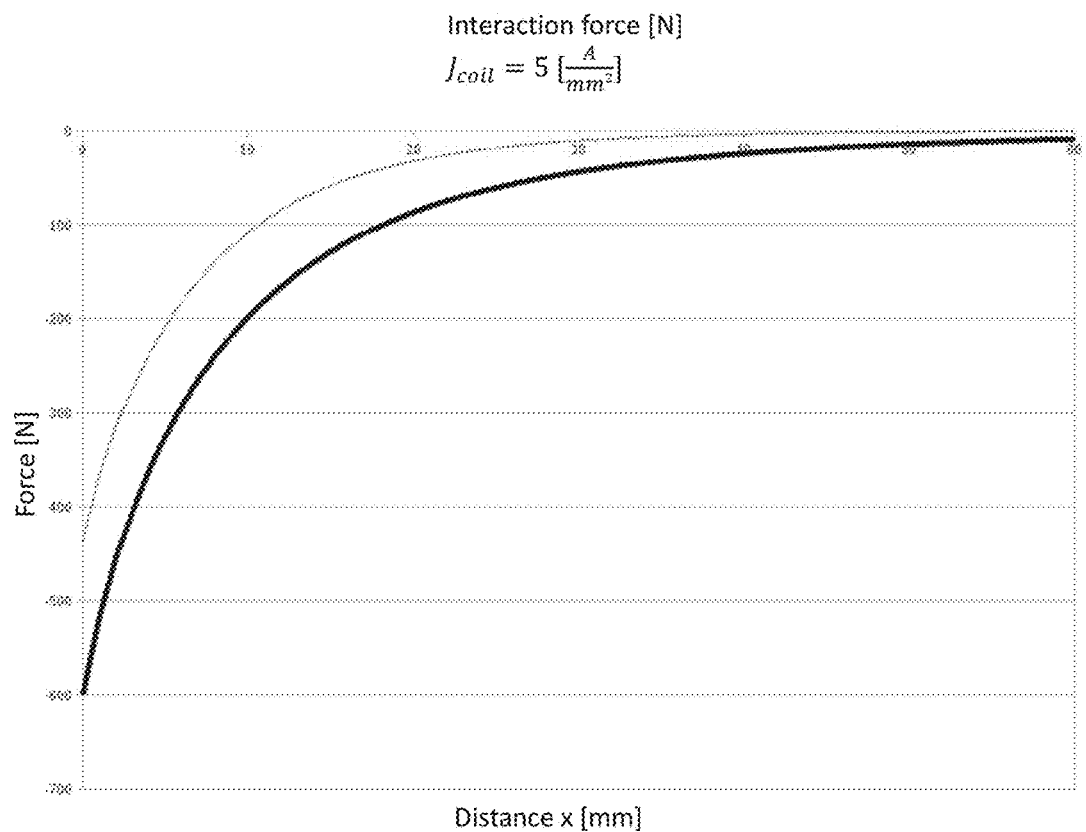

In analogy to FIG. 7, FIG. 9 is a diagram relating to FIG. 8 on the development of the interaction force in relation to the distance between permanent magnet and electromagnet when $$J_{coil} = 5\left[\frac{A}{mm^2}\right]$$

is supplied. FIG. 8 thus shows the mode of action of the use of an embodiment of the inventive magnetic device. The attractive interaction force is increased thereby (continuous line).

In addition, the force distance line in case of no current supply is shown by the stroked line.

Figure 10:
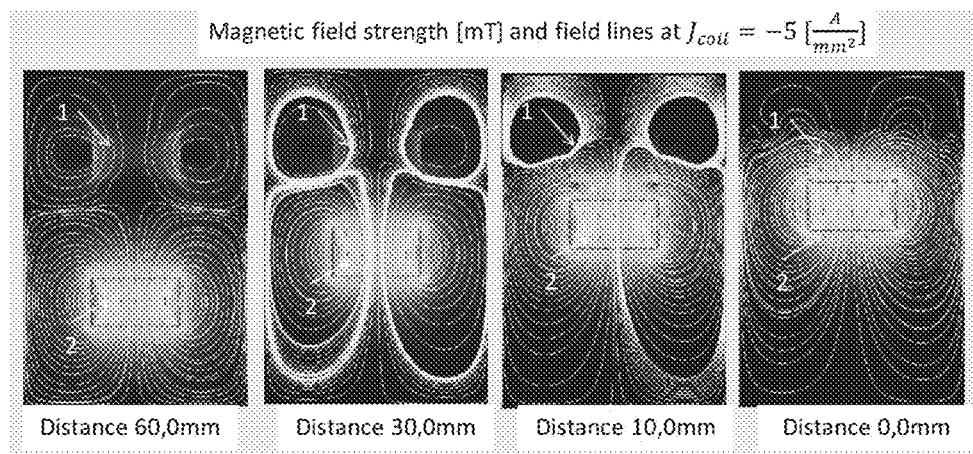
Figure 11:
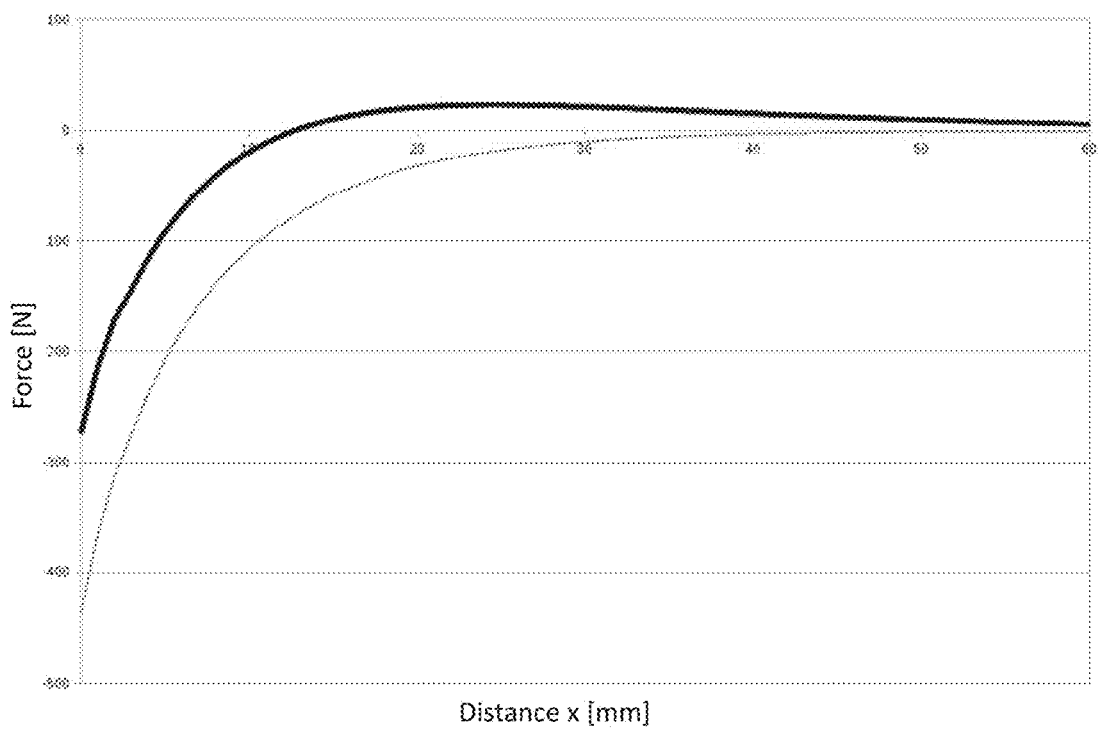

In analogy to FIG. 8 and FIG. 9, FIG. 10 shows the result of a FEM simulation when the electromagnet is supplied with $J_{coil}$=−5 [A/mm²], and FIG. 11 shows the corresponding diagram. FIG. 11 shows the course of the interaction force in relation to the distance between permanent magnet and electromagnet when the electromagnet is supplied with $J_{coil}$=−5 [A/mm²] with the continuous line. The stroked line shows the course without current supply to the electromagnet. FIG. 10 and FIG. 11 also relate to the mode of action of an embodiment of the inventive magnetic device.

According to FIG. 11, repulsive interaction force only occur within a distance of x>14.0 mm. The magnetic field of the electromagnet shown in FIG. 10 is thus not strong enough with regard to the attractive force generated by the magnetic field.

Figure 12:
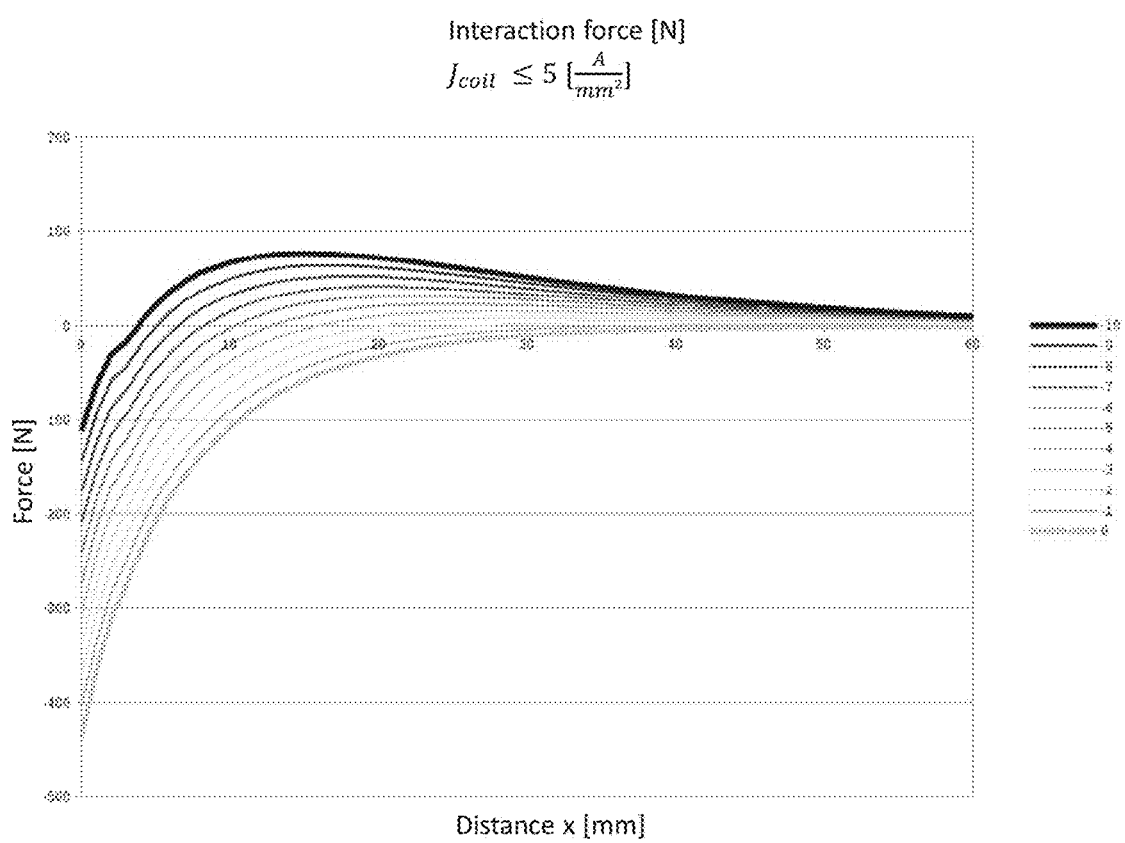

FIG. 12 shows the effect of the supply of the electromagnet with a current density of $J_{coil}$=−5 [A/mm²]. Again, the abscisse shows the distance between permanent magnet and electromagnet, and the ordinate shows the force acting between the permanent magnet and the electromagnet. A person skilled in the art will see from FIG. 12 that the generation of a state of the magnetic device mainly characterized by a repulsive force will imply supplying the electromagnet 2 with a current.

When $H_{coil}(J)$<−$H_1(x)$ is not satisfied, the interaction force is an attractive interaction force. In this case the translator is captured at the stator.

Furthermore, if the electromagnet is constantly supplied with a current, there is an equilibrium point $x_{eq}$ regarding the distance between the permanent magnet and the electromagnet. The equilibrium point is defined by $H_{coil}(J)$<−$H_1(x_{eq})$, e.g.

$J_{coil}$=−10 [A/mm²] ⇒ $x_{eq}$=4 [mm]

$J_{coil}$=−5 [A/mm²] ⇒ $x_{eq}$=13 [mm].

The area in which the capturing effect occurs is defined by ∀ x∈[0,$x_{eq}$[, F(x,$J_{coil}$)<0. Outside the area of the capturing effect, the interaction force is a repulsive interaction force ∀ x>$x_{eq}$, F(x,$J_{coil}$)>0. At a defined current density $J_{coil}$, the equilibrium position is defied by F($x_{eq}$, $J_{coil}$)=0.

Figure 13:
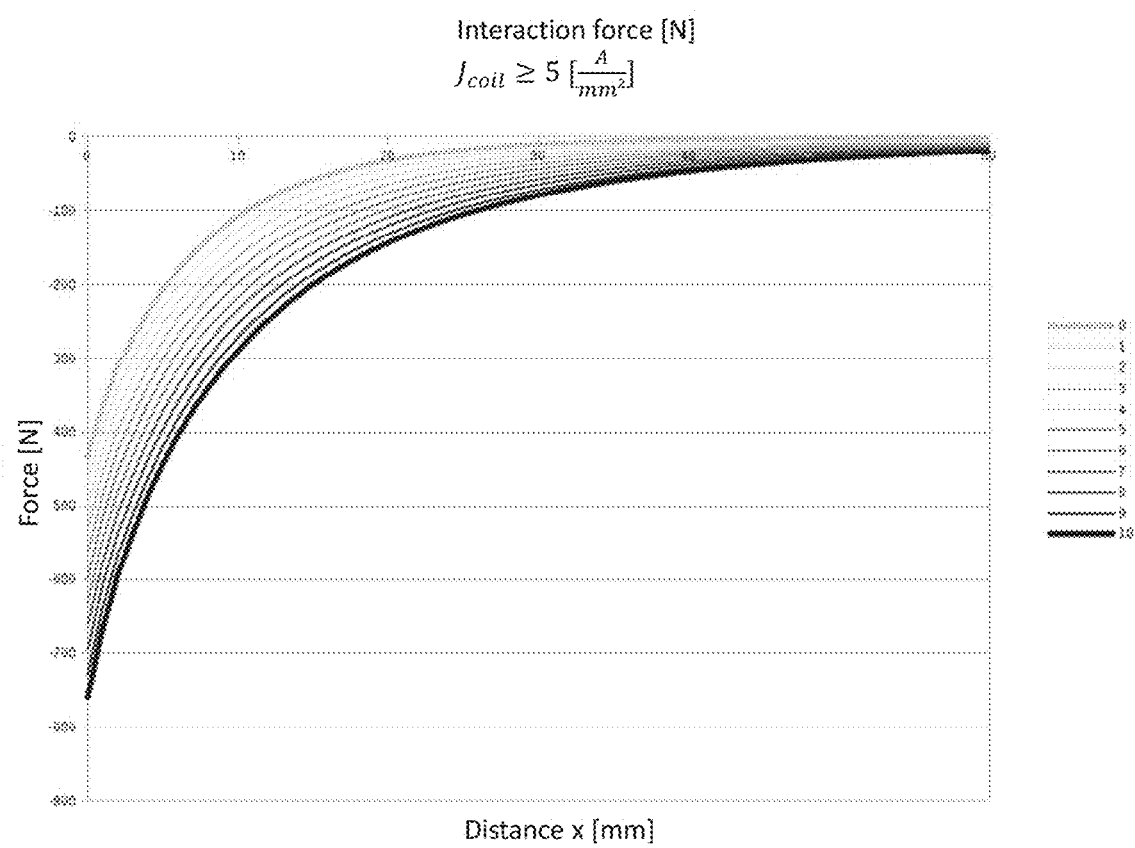

Supplementary to FIG. 12, FIG. 13 shows the case of supplying the electromagnet with a current density of $J_{coil}$≥0 [A/mm²] within the coil.

Figure 14:
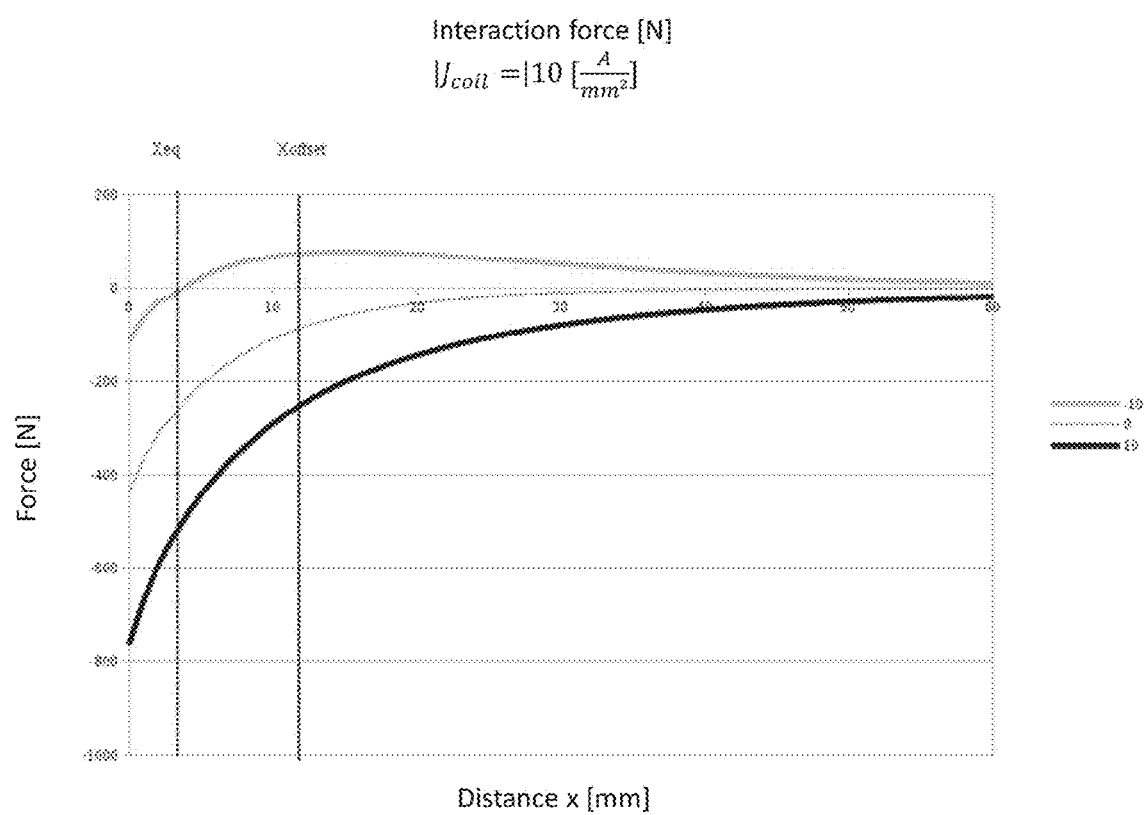

In addition, FIG. 14 compares the development of the force acting between the permanent magnet and the electromagnet when the electromagnet is supplied with $$J_{coil} = +10\left[\frac{A}{mm^2}\right] \text{ and } J_{coil} = -10\left[\frac{A}{mm^2}\right].$$

It should be mentioned that the resulting strength of the force is not the same with varying current supplies.

Based on the above discussion of the interaction between a permanent magnet and an electromagnet, below the interaction in the special case of a translator oscillating with regard to a stator is discussed. The oscillation of the translator is achieved by switching the polarity of the electromagnet in determined time intervals with a constant electrical energy, such as $$|J_{coil}| = 10\left[\frac{A}{mm^2}\right].$$

For reasons of simplification, the time lag when switching the electromagnet due to the interior resistance and inductivity of the coil is not taken into consideration in the following discussion of the problem.

In order to guarantee efficient oscillation of the translator, the translator has to be operated outside of the capturing area. This leads to the definition of a minimum distance ϵ between the permanent magnet and the electromagnet. This leads to ∀x≥ϵ, F(x,$J_{coil}$)=F(x,$J_{coil}$)$e_x$, with the operation of the translator being guaranteed outside of the capturing area by the condition ϵ≥$x_{eq}$.

For the operation outside of the capturing area it must be made sure that the field force profile $J_{coil}$=Cte[A/mm²] is asymmetrical at a constant electrical energy. The value of the attractive interaction force is higher than the value of the repulsive interaction force. Consequently, the minimum distance ϵ reduces the maximally activatable attractive force.

ϵ=$x_{eq}$⇒$F_{max}$(0,10)=500[N]

ϵ=$x_{offset}$⇒$F_{max}$(0,10)=200[N], wherein the positions $x_{eq}$ und $x_{offset}$ are functions of the current density within the coil $J_{coil}$ and thus depend on an interior time factor of the coil $$\tau_{coil} = \frac{L_{coil}}{R_{coil}}.$$

The asymmetry of the field force profile can be explained by the additional energy required, which has to be used to act against the magnetic field. In the above discussion of the interaction between a permanent magnet and an electromagnet, this additional energy was provided by the coil of the electromagnet, the coil being supplied with a higher current density. For guaranteeing the repulsive interaction energy, the following condition has to be satisfied: $H_{coil}(J)$<−$H_1(x)$.

The equilibrium point corresponding to the boundary point of the capturing area is defined by: $H_{coil}(J)=-H_1(x_{eq})$.

In case the translator oscillates relative to a stator, a mechanical acceleration unit can be advantageous, which has a similar effect with regard to the force state acting on the translator as supplying the coil with an additional current density as discussed above. Here, the acceleration unit serves to supply the translator with an acceleration force state that acts against the attractive force of the permanent magnet acting on the translator, in particular in case the electromagnet is not operated.

When using the inventive device, the force state as the sum of the attractive force acting on the translator and the acceleration force state should be zero at any position. The force state $\vec{F}_{TOT(x,J)}$ acting on the translator at a position x with the coil being supplied with a current density J is expressed by the following equation:

$\forall x \geq 0$, $F_{TOT}(x,J)=F(x,J)+F_{corr}(x)$, wherein $F_{corr}(x)$ is the acceleration force state caused by the acceleration unit and comprising the corrective force $F_{corr}(x)$, and $F(x,J)$ is the interaction force active between the stator and the translator. The required mechanical effect results from the equilibrium condition for the translator $\forall x \geq 0$, $F_{TOT}(x,0)=0 \Rightarrow F_{corr}(x)=-F(x,0)$, which leads to the following characterization of the acceleration unit: $\forall x \geq 0$, $F_{corr}(x)=-F(x,0)$, so that the acceleration force state or the corrective force does not act against the attractive force of the stator at any operation of the electromagnet, so that the sum total of the active forces of a force state are zero. This results in:

$\forall x \geq 0, F_{TOT}(x,0)=0$ $\forall x \geq 0, \forall J, F_{TOT}(x,J)=\{F(x,J)-F(x,0)\}e_x$.

Figure 15:
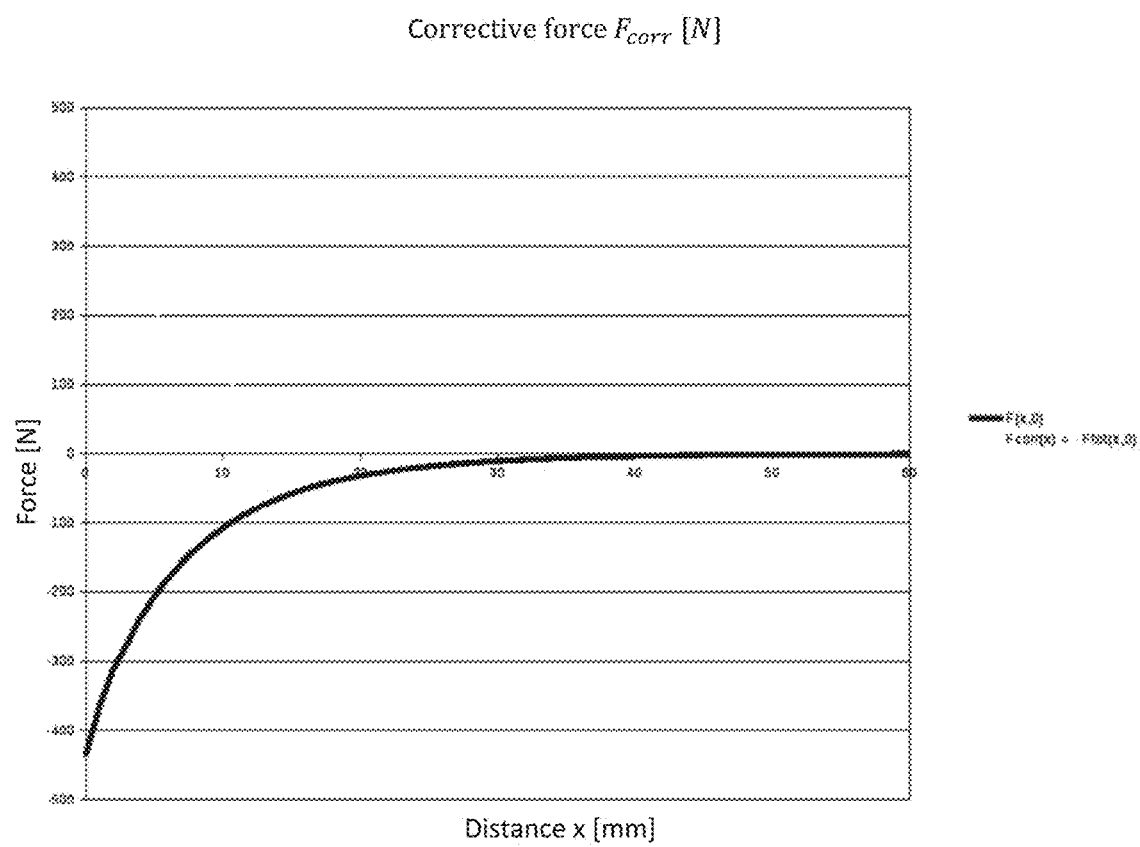

FIG. 15 shows the course of an attractive interaction force acting on the translator and the course of the corrective force dependent on a distance between the translator and the stator shown on the x-axis. The courses of the graphs in FIG. 15 are substantially mirror images around the x-axis.

Figure 16:
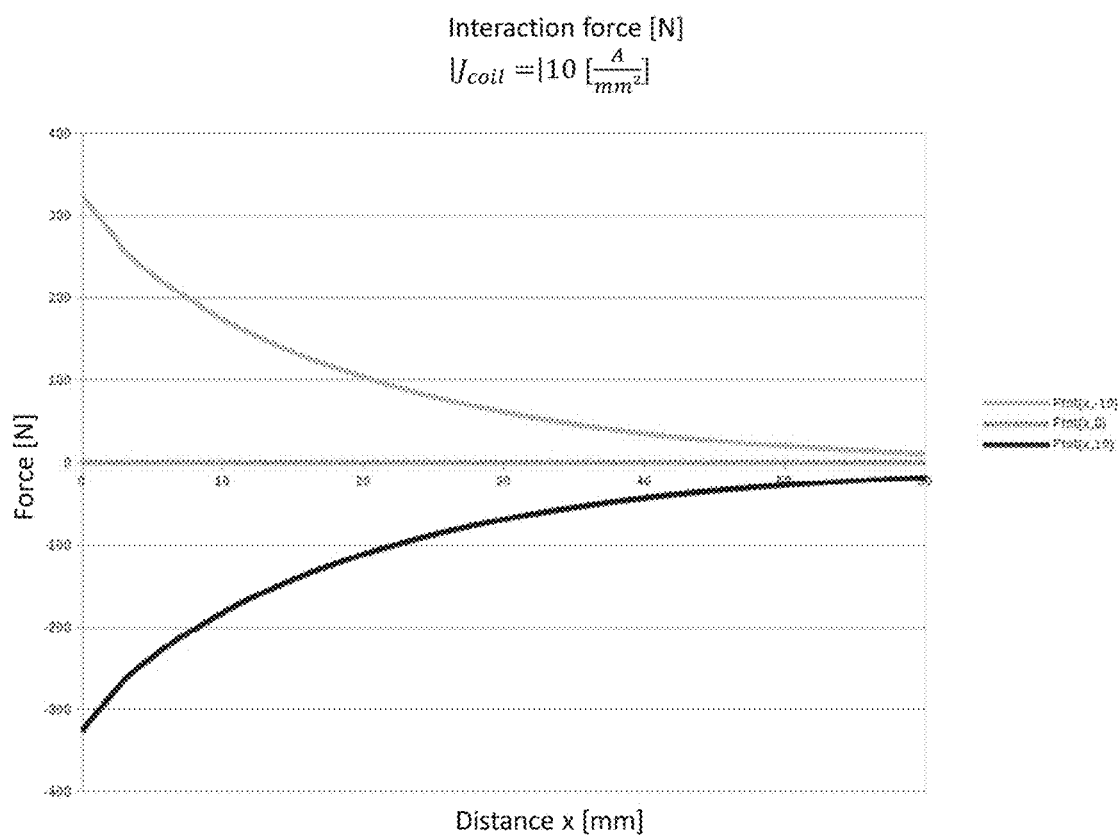

FIG. 16 shows the course of a force acting on the translator dependent on the distance between the translator and the stator in three different cases of supplying the coil of the electromagnet with a current density, namely $J_{coil}=+10$ [A/mm$^2$], $J_{coil}=-10$ [A/mm$^2$] and $J_{coil}=0$ [A/mm$^2$]. The sum total of the forces acting on the translator is defined by $\forall x \geq 0$, $\forall J$, $F_{TOT}(x,J)=\{F(x,J)-F(x,0)\}e_x$, wherein the equilibrium is reached at $\forall x \geq 0$, $F_{TOT}(x,0)=0$. Furthermore, there is a repulsive interaction force when $H_{coil}(J)<0 \Rightarrow J_{coil}<0$ is satisfied. In the contrary case there is an attractive interaction force, when $H_{coil}(J)>0 \Rightarrow J_{coil}>0$ is satisfied. The course of the forces is essentially symmetrical with the x-axis of the graph. The values of the repulsive interaction force and the attractive interaction force are essentially equal because they are defined by the current density within the coil of the electromagnet.

Figure 17:
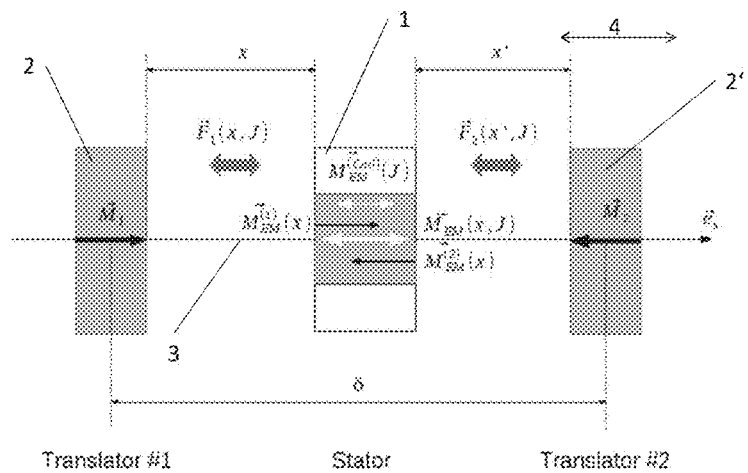

Below, the above discussions are applied to a magnetic device comprising n translators (n=1, 2, 3 . . . ) and n+1 stators. FIG. 17 shows the basic arrangement of two stators and one translator along an axis corresponding to the movement axis of the translator.

Below, a magnetic device with a stator and two translators is described. The stator 1 is provided as a electromagnet comprising a core and a coil, the translators 2, 2' are provided as permanent magnets.

According to FIG. 17, the distance between surface of the first translator 2 facing the stator 1 and the surface of the stator 1 facing the first translator 2 is determined to be x, while x' indicates the distance between the surface of the second translator 2' facing the stator 1 and the surface of the stator 1 facing the second translator 2'. δ indicates the distance between the core of the first translator 2 and the core of the second translator 2', wherein d stands for the length of the translator movement path 3, so that the following is satisfied:

$\forall x \in [0, d], \forall x' \in [0, d], \delta = Cte$ $x \in [0, d]$ $x' = d - x \Rightarrow x' \in [0, d]$ The core of the electromagnet as part of the stator 1 is magnetized by three magnetic fields, namely the magnetic field created by the first translator 2, which is positioned at a distance x from the stator.

$M_{EM}^{(1)}(x)=\chi_v H_{EM}^{(1)}(x)$, wherein $H_{EM}^{(1)}(x)=M_1 \times f(x)e_x$.

The second magnetic field of the second translator 2' at a distance x' from the stator 1 can be described by $H_{EM}^{(2)}(x')=-M_2 \times f(x')e_x$, wherein when x'=d-x is used, the following is satisfied: $H_{EM}^{(2)}(x')=-\chi_v H_{EM}^{(2)}(d-x)=-\chi_v M_2 f(d-x)e_x$.

The third magnetic field is the magnetic field created by the coil of the electromagnet, $M_{EM}^{(coil)}(J)=\chi_v H_{coil}(J)e_x$, wherein the direction of the current defines the direction of the magnetic field $J>0 \Rightarrow I>0 \Rightarrow H_{coil}(J)>0$.

Magnetization of the core of the electromagnet can be summarized as $M_{EM}(x,J)=\chi_v \{M_1 f(x)-M_2 f(d-x)+H_{coil}(J)\}e_x$, wherein f(x) is an inversely proportional function regarding x, with $f(0) = 1$ $\lim_{\infty} f(x) = 0$.

Below, $F_1(x,J)$ is the interaction force state between the stator 1 and the first translator 2, $F_2(x,J)$ is the interaction force state between the stator 1 and the second translator 2', so that for the force state acting on the stator 1 the following applies: $F_{EM}(x,J)=F_1(x,J)+F_2(x,J)$.

The term x∈[0, d] describes the displacement of the translators 2, 2' along the axial translator movement path 3, wherein a movement from left to right is regarded as a movement into a "positive" direction from the starting position x=d or x'=0 to an end position x=d or x'=0, respectively. A movement from right to left is regarded as a "negative" movement from the starting position x=0 or x'=d to an end position x=d or x'=0, respectively.

When $M_{EM}(x,J)=M_{EM}(x,J)e_x$ with $M_{EM}(x,J)>0$, the following applies:

The first translator 2 and the stator 1 are polarized in the same direction in FIG. 17, so that the interaction force is an attractive force and $F_1(x,J)>0$ is satisfied. This applies in the case of $H_{coil}(J)>-M_1 f(x)$ with max(f(d-x)) then $H_{coil}(J)>M_1$.

The second translator 2' and the stator 1 are polarized in different directions, so that the interactive force is a repulsive force. This is achieved when of $H_{coil}(J)>M_2 f(d-x)$ and max(f(d-x))=1, when $\forall x \in [0,d]$, $H_{coil}(J)>M_2$.

A movement from left to right is achieved when $\forall x \in [0,d]$, $H_{coil}(J)>M_2>0>-M_1$ results in a "positive" magnetization of the stator.

The capturing effect occurs when $M_2 > H_{coil}(J) > -M_1$. The stator 1 is captured by the magnetic field of the second translator 2' or vice versa.

When $M_{EM}(x,J) = M_{EM}(x,J)e_x$ with $M_{EM}(x,J) < 0$, the first translator 2 and the stator 1 are polarized in opposite directions, so that the interaction force is a repulsive force and $F_1(x,J) < 0$ applies. This is achieved by $\forall\ x\epsilon[0,d]$, $H_{coil}(J) < -M_1$.

The second translator 2' and the stator 1 are polarized in the same direction, so that the interaction force is an attractive force and $F_2(x,J) < 0$ applies. This is achieved when $H_{coil}(J) < M_2 f(d-x)$ and $\max(f(d-x)) = 1$; thus $\forall x\epsilon[0,d], |H_{coil}(J)| < M_2$ $M_1$ and $M_2$ are positive, so that a movement from right to left of the translators 2, 2' can be deducted when $\forall\ x\epsilon[0,d]$, $H_{coil}(J) < -M_1 < 0 < M_2$ describes a "negative" polarization of the translators 2, 2'.

The capturing problem occurs when $-M_1 < H_{coil}(J) < M_2$, so that the stator 1 is captured by the magnetic field of the first translator 2.

When the magnetic fields are equally strong, $M_1 = M_2 = M$, a "positive" polarization and a movement from left to right is achieved when $\forall\ x\square[0,d]$ and $H_{coil}(J) > M$. Conversely, a "negative" polarization and a movement from right to left is achieved when $\forall\ x\epsilon[0,d]$ and $H_{coil}(J) < -M$. The capturing effect occurs when $H_{coil}(J)\epsilon[-M,M]$; the capturing effect can be prevented when it is guaranteed that $|H_{coil}(J)| > M$.

The system is in equilibrium when $$M_{EM}(x, J) = 0 \Rightarrow \chi_V\{-M_1 f(x) + M_2 f(d-x) + H_{coil}(J)\} =$$
$$0 \Rightarrow H_{coil}(J) = M_1 f(x) - M_2 f(d-x).$$

Assuming that the magnets have the same polarization $M_1 = M_2 = M_3$, the translator is in equilibrium when $H_{coil}(J) = M\{f(x) - f(d-x)\}$.

In case of an electromagnet that is not supplied with a current, the system has an interior equilibrium when $H_{coil}(J) = 0 \rightarrow M\{f(x) - f(d-x)\} = 0 \rightarrow f(x) = f(d-x)$, which is on the one hand achieved at $$x\frac{d}{2}.$$

This is the case when the first translator and the second translator have the same magnetization and are at the same distance from the stator.

When using translators with different field strengths, the equilibrium point shifts away from the stronger translator, in order to satisfy $M_1 f(x_{eq}) = M_2 f(d - x_{eq})$.

FIG. 18 to FIG. 24 show the result of a simulation by means of FEM. The simulation is based on the following assumptions:

The stator 1 is seen as an electromagnet with a ferromagnetic core made of soft metal and with a diameter of 30.0 mm and a length of 30.0 mm (cylindrical shape). The coil is assumed to have a current density $$J_{coil}\left[\frac{A}{mm^2}\right]$$

and a body made with copper with a cross-sectional area of $30\times30$ mm$^2$.

The translators 2, 2' are assumed to be permanent magnets having a cylindrical shape with a radius of 30.0 mm and a length of 30.0 mm, wherein the permanent magnets are magnetized in the direction of the cylinder axis. A magnetization value of $M_1 = M_2 = M = 10E5[A/m]$ is assumed, which corresponds to a commercial N45° permanent magnet. The translators 2, 2' can move freely along the linear translator movement path 3, which also constitutes the system axis. The relative positions of the translators 2, 2' are described by the variable $x\epsilon[0,d][mm]$.

In FIG. 18 to FIG. 24, the interaction force is shown for a position of the translators $x\epsilon[0,73][mm]$ and for a supply of the stator with $J_{coil}\epsilon[-10,10][A/mm^2]$ dependent on the position of the translators.

Figure 18:
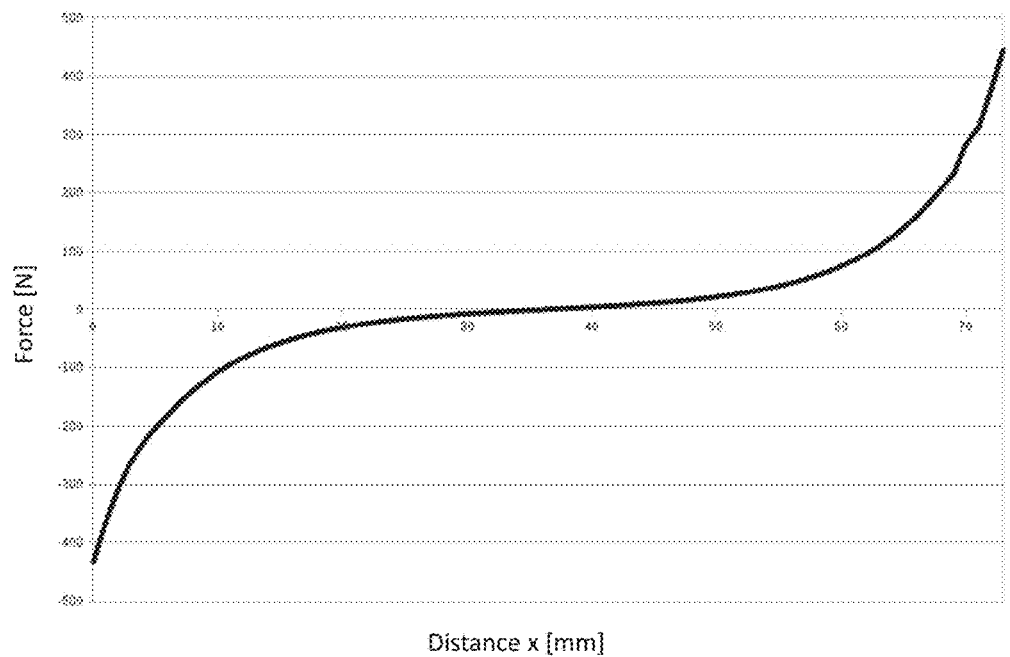

FIG. 18 shows the case of an electromagnet being supplied with $J_{coil} = 0[A/mm^2]$ for an area of the position of the translator $x\epsilon[0,d]$. In accordance with the above discussion, the equilibrium point $F_{EM}(x_{eq}, 0) = 0$ is in the middle of the translator movement $$x_{eq} = \frac{d}{2}.$$

Figure 19:
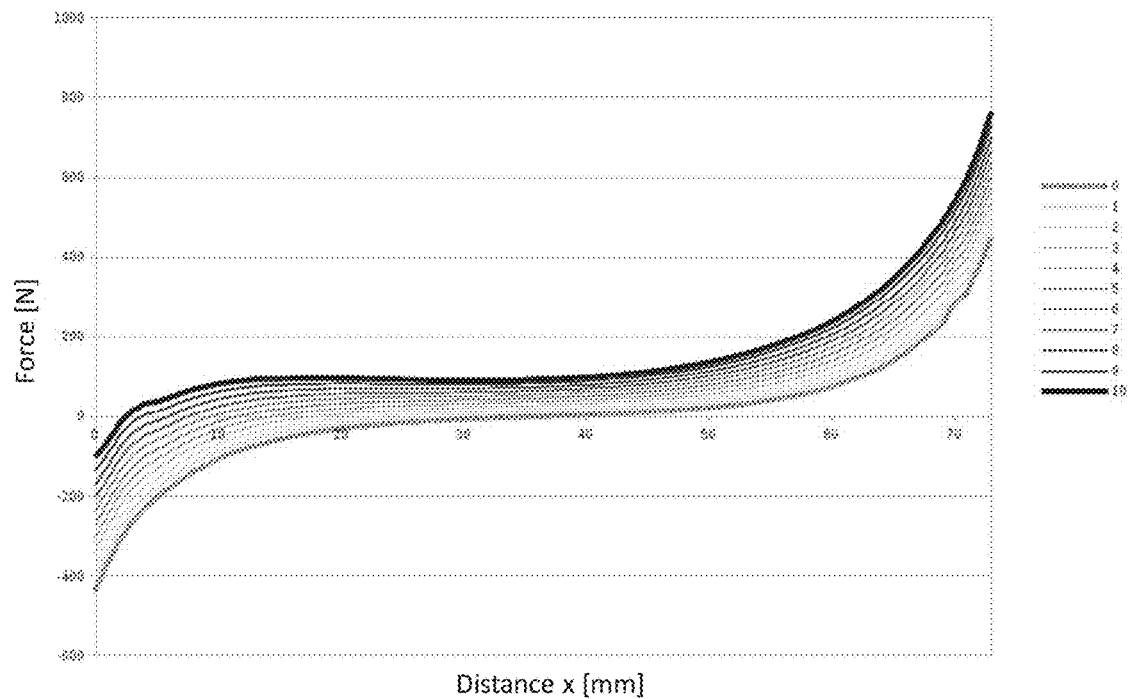

FIG. 19 shows the development of the interaction force when the stator provided as an electromagnet is supplied with $J_{coil}\epsilon[0,10]\ [A/mm^2]$ in an area of the translator $x\epsilon[0,73]\ [mm]$. The supply of the stator with a current leads to a positive magnetization thereof. The stator and the first translator are subject to an attractive interaction force; the stator and the second translator are subject to a repulsive interaction force. The condition for a repulsive interaction between the stator and the second translator $|H_{coil}(J)| > M_2$ is not satisfied when the stator is close to the second translator.

Figure 20:
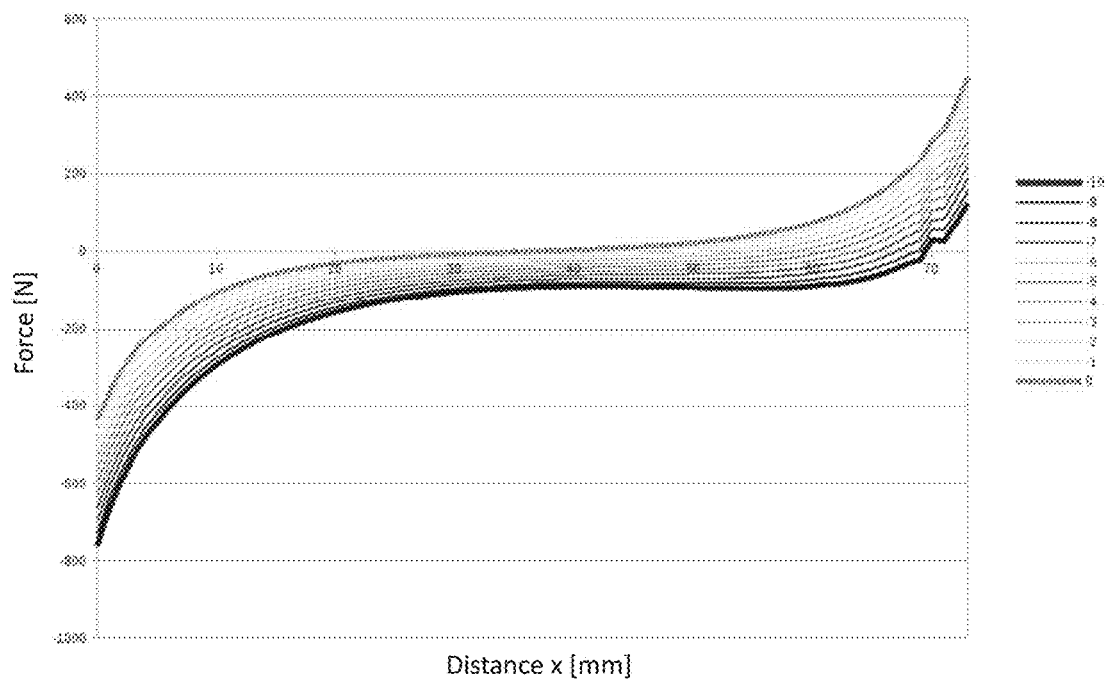

FIG. 20 shows the development of the interaction force when the stator is supplied with $J_{coil}\epsilon[-10,0][A/mm^2]$ dependent on the position of the stator within an area of $x\epsilon[0,73][mm]$. This leads to a negative magnetization of the stator; the stator and the second translator are subject to an attractive interaction force, while between the stator and the first translator, there is a repulsive interaction force.

The condition for a repulsive interaction force between the stator and the first translator is not satisfied when the stator is close to the first translator.

Figure 21:
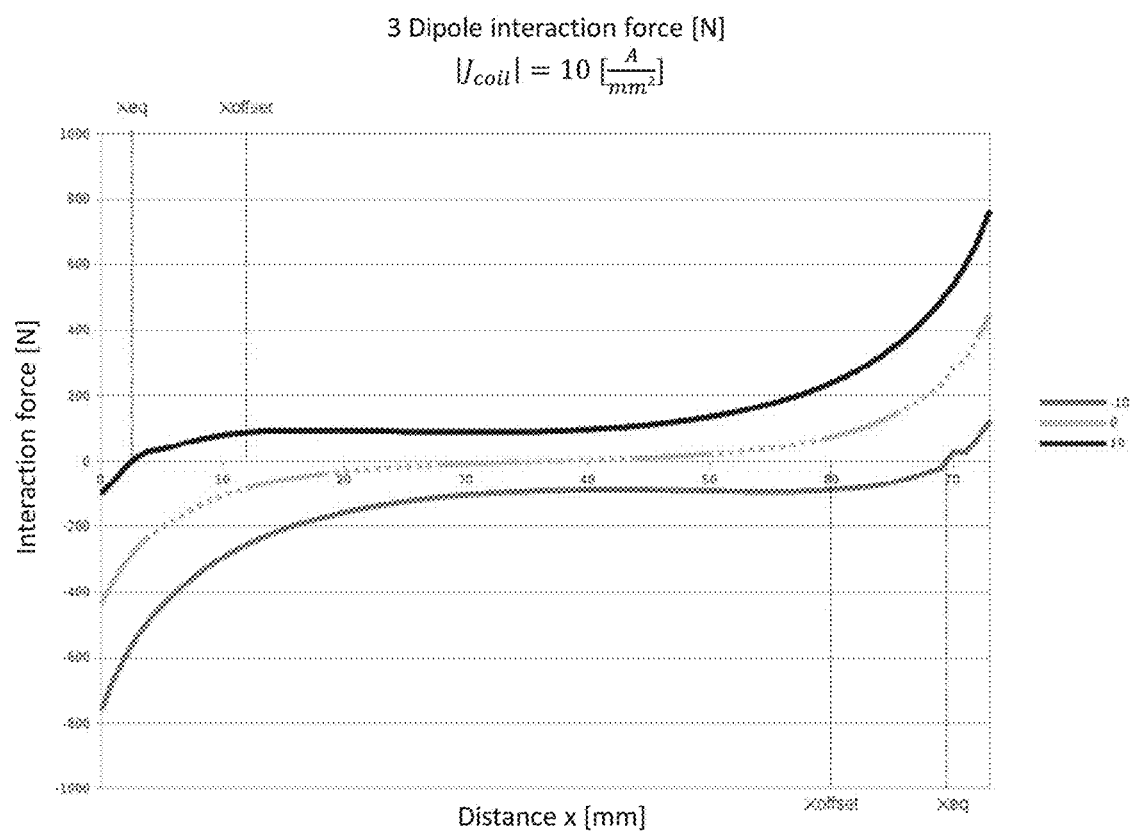

FIG. 21 compares the case of supplying the stator 1 provided as an electromagnet with $J_{coil}\epsilon[0,10][A/mm^2]$ with the case of supplying it with $J_{coil}\epsilon[-10,0][A/mm^2]$ dependent on the position of the first translator 2, for an area of $x\epsilon[0,73][mm]$.

In the area (in the following called "capturing area"), in which the condition $\forall x\epsilon[0, d], H_{coil}(J) > M$ is not satisfied and in which the capturing effect occurs, the interaction force acts against a desired movement of the translators 2, 2'. The end point of the capturing area is defined by the equilibrium point $x_{eq}$.

The capturing area basically corresponds to the position of the stator at which the magnetic field of the stator does not equalize the magnetic field of the closer translator of the translators 2, 2'.

A person skilled in the art will recognize that for maintaining an efficient oscillation of the translators, the movement of the translators 2, 2' should take place outside of the capturing area. This results in a minimum distance $\epsilon \geq x_{eq}$ between the first translator and the stator.

Figure 22:
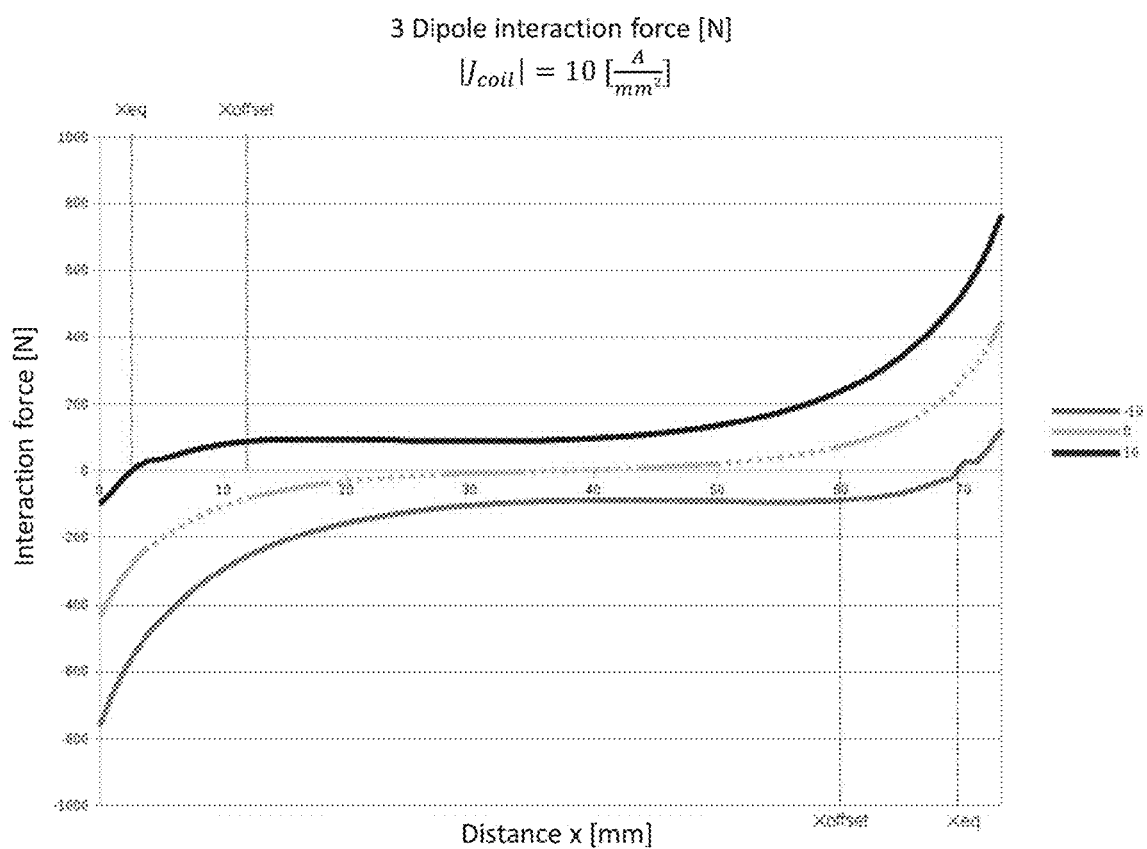
Figure 23:
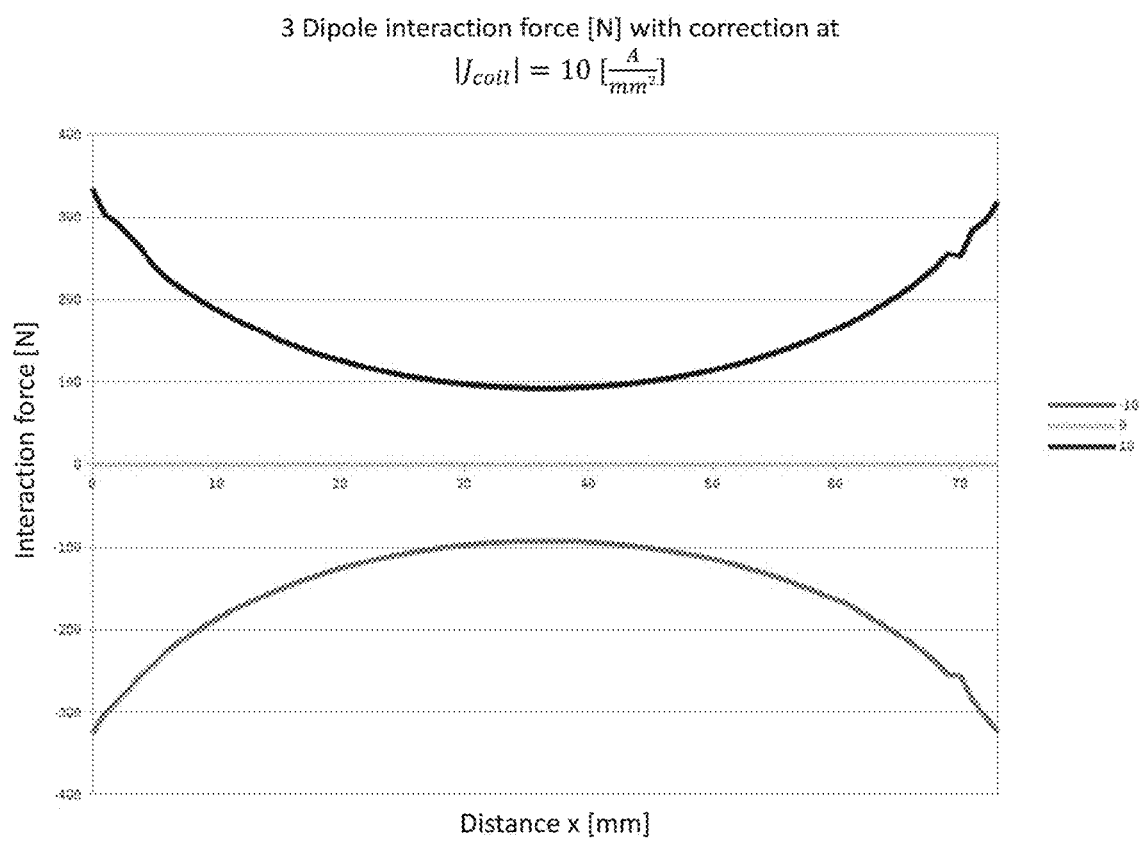
Figure 24:
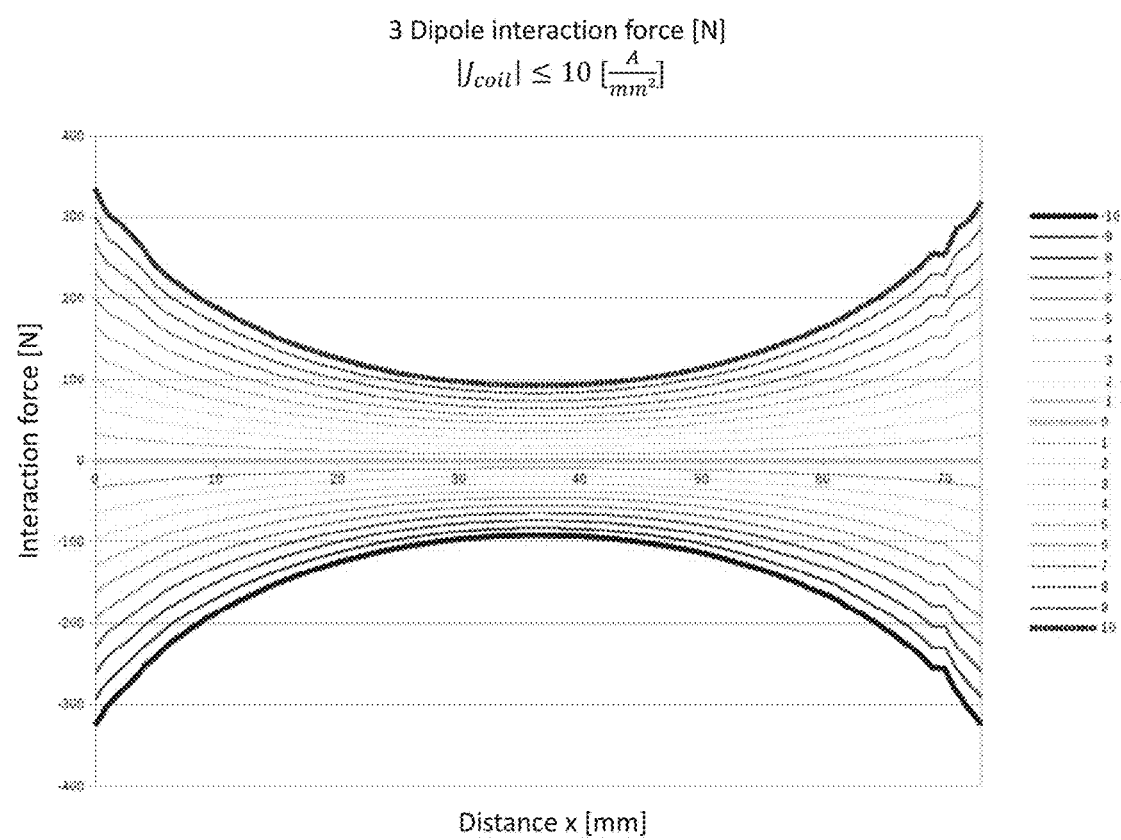

FIG. 22 to FIG. 24 relate to the use of an acceleration unit.

In the above discussion the acceleration force state activated by the acceleration unit, in particular the corrective force, was defined by the term $F_{corr}(x)$ dependent on the distance between the first translator 2 and the stator 1, so that the force state acting on the first translator 1 is calculated by the equation $F_{TOT}(x,J)=F(x,J)+F_{corr}(x)$.

As a second characteristic of the acceleration unit, the presence of an equilibrium state was selected, which should be present when the electromagnet is not operated: $F_{TOT}(x,0)=0 \Rightarrow F_{corr}(x)=-F(x, 0)$.

The acceleration force state caused by the acceleration unit comprising $\vec{F}_{corr}$ basically corresponds to the capturing force state, which according to the invention has to be at least partly superposed by the acceleration force state. The acceleration force state, in particular the course thereof, may be deducted by measurements in case the electromagnet is not operated.

FIG. 22 compares the course of the acceleration force state guaranteeing $F_{Corr}(x)=-F(x,0)$. In addition, the interaction force is shown as a stroked line, in case the stator provided in the form of an electric drive is not active.

FIG. 23 shows the course of $F_{TOT}(x,J)$ when using an acceleration unit and when the stator is supplied with a "positive" or "negative" current density $J_{coil}=0$ [A/mm²] as a function of the position of the distance between the translator and the stator. The graph shows the area $x \in [0,73]$ [mm]. In addition, the dotted line shows the course of $F_{TOT}(x,J)$ when the stator is not supplied with any current.

The course of force shown in FIG. 23 is based on the simplification that the first translator and the second translator have the same magnetization. This results in an equilibrium position at $$x_{eq} = \frac{d}{2}$$

for an electromagnet without supply $$F_{TOT}\left(\frac{d}{2}, 0\right) = 0.$$

The force state shown in FIG. 23 using an acceleration unit has the following characteristics:

The translator not supplied with any current is always in equilibrium: $\forall\ x \in [0,d]$, $F_{TOT}(x,0)=0$. The equilibrium position mention above $$x_{eq} = \frac{d}{2}$$

becomes the point of symmetry of the course of the corrected interaction force $F_{TOT}(x,J)$. The profile of the course of the corrected interaction force is U-shaped.

FIG. 24 shows the course of the corrected interaction force $F_{TOT}(x,J)$ at different current supplies to the electromagnet with $J_{coil} \in [-10,10][A/mm^2]$ dependent on the relative position of the translator for an area $x \in [0,73][mm]$.

An optimal movement of the translator from left to right is characterized by $F_{TOT}(x,J)>0$. This is achieved at $J>0$. Conversely, a movement of the translator from right to left is achieved by $F_{TOT}(x,J)<0$ at $J<0$.

Figure 25:
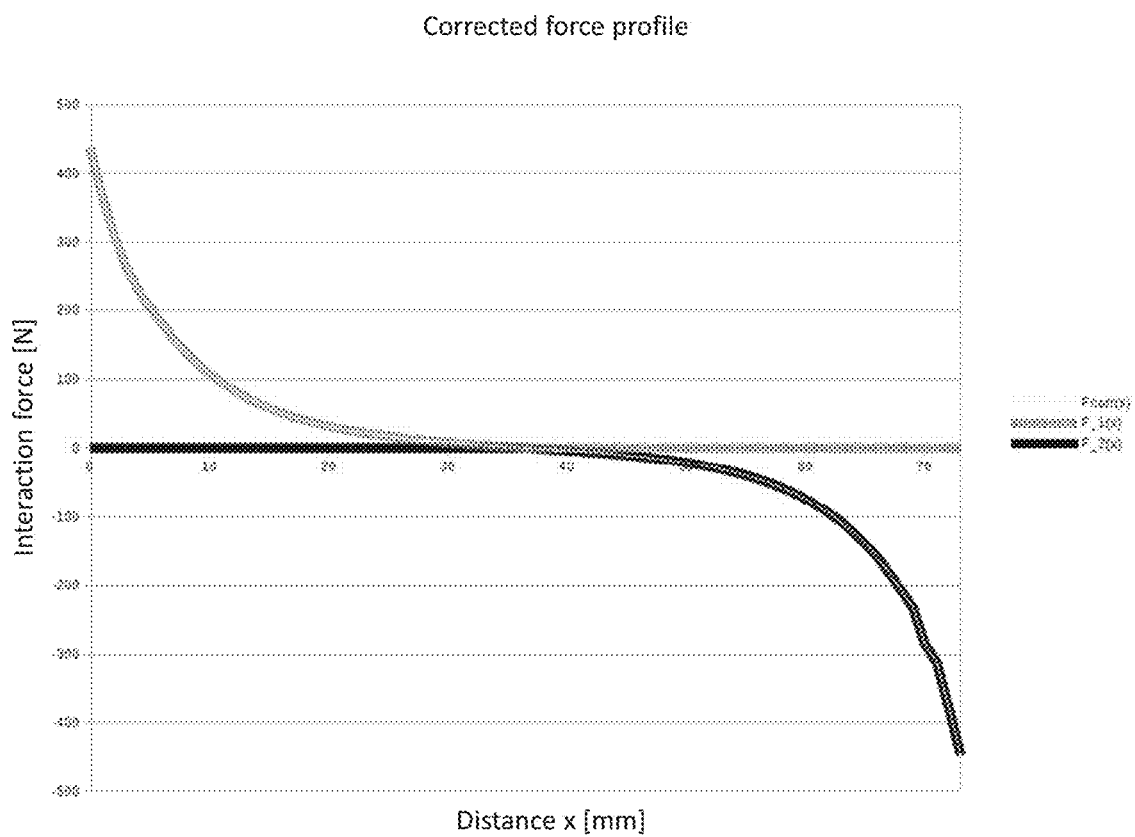
Figure 26:
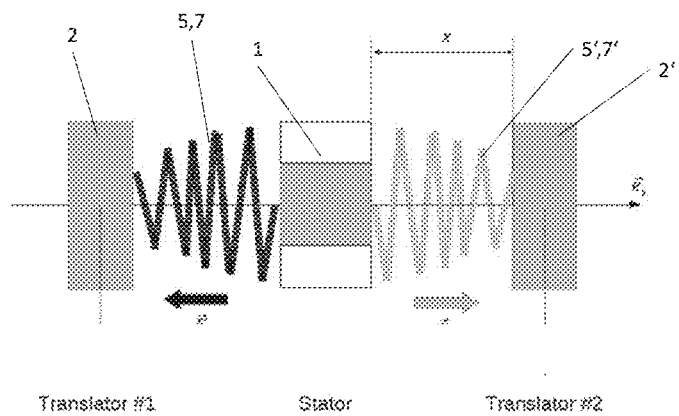
Figure 27:
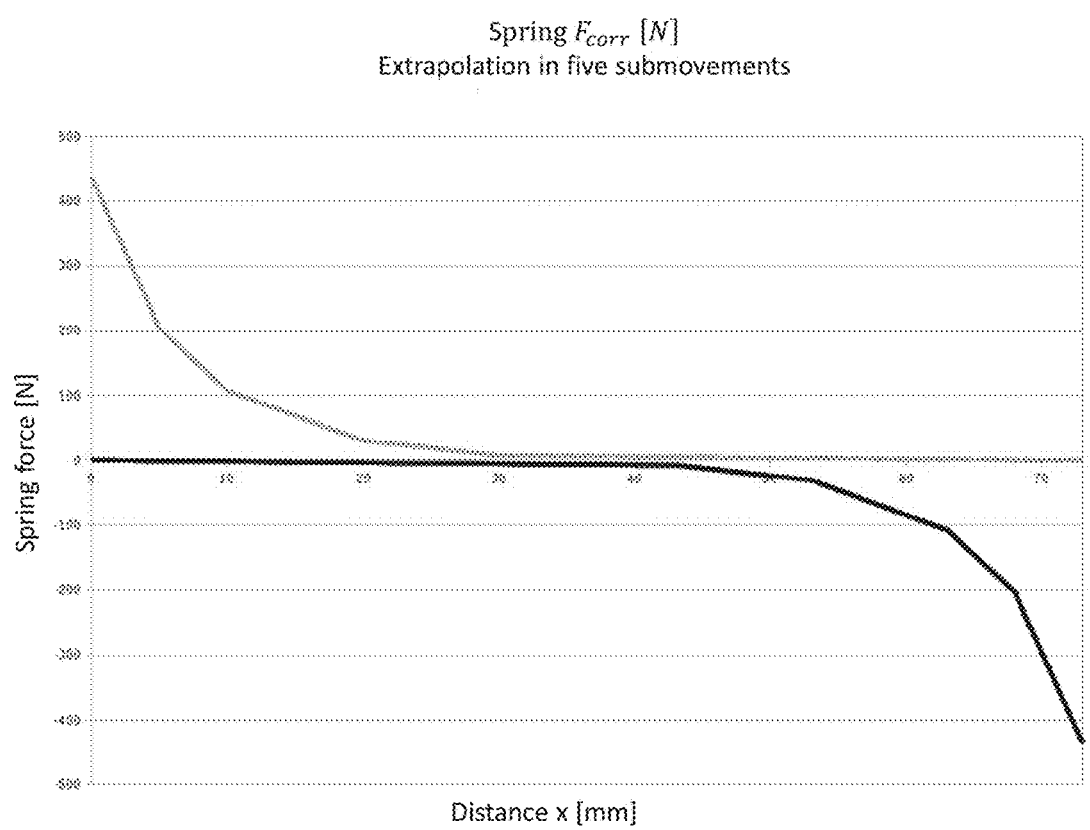

FIGS. 25 to 27 refer to a particular embodiment of the acceleration unit, namely in the form of a spring. The mode of action of the spring is discussed following the characteristic of the acceleration unit described above.

Since $$x_{eq} = \frac{d}{2}$$

is the point of symmetry of the course of the corrected force, the corrective force can be expressed as the sum total of two spring forces taking into account the mechanical properties of a spring: $\forall\ x \in [0,d]$, $F_{Corr}(x)=F_1(x)+F_2(x)$ $$\forall\ x \in \left[0, \frac{d}{2}\right[, F_1(x) > 0, F_2(x) = 0 \text{ and } \forall\ x \in ]\frac{d}{2}, d],$$
$$F_1(x) = 0, F_2(x) < 0.$$

FIG. 25 shows the course of $\forall\ x \in [0,d]$, $F_{Corr}(x)=F_1(x)+F_2(x)$. Here, $\forall\ x \in [0,d]$, $F_1(x) \geq 0$ always causes a "positive" force, and $\forall\ x \in [0,d]$, $F_2(x) \leq 0$ always causes a "negative" force. The first spring force $F_1$ is exclusively active in the area $$x \in \left[0, \frac{d}{2}\right[,$$

so that the first spring force counteracts the interaction between the stator and the first translator. In analogy, the second spring force $F_2$ is exclusively active in the area $$x \in ]\frac{d}{2}, d]$$

and counteracts the interaction between the stator and the second translator.

When the first translator and the second translator have the same magnetization, the first spring force and the second spring force can be specified as follows. The first spring force and the second spring force have the same values and act in different directions.

$$\forall x \in [0,d], F_2(x)=-F_1(d-x).$$

The above discussion results in the arrangement of a first spring and a second spring having equal spring properties, but acting in different directions.

FIG. 26 shows a possible embodiment of the inventive magnetic device using springs 7, 7' as acceleration units 5, 5'.

The first spring 7 extends between the stator 1 and the first translator 2 acting on the respective surfaces. The first spring 7 counteracts a capturing effect between the stator 1 and the first translator 2. The bias of the first spring 7 depends on the approach of the first translator 2 to the stator 1. The stator 1 serves as fixed point 6 for the first spring 7. At the same time, the first spring force $F_1$ is released dependent on the distance between the first translator 2 and the stator 1 as a "positive" force.

The second spring 7' acts in analogy to the first spring 7. In analogy to the arrangement of the first spring 7, the second spring 7' is arranged between the stator 1 and the second translator 2'. The stator 1 acts as fixed point 6 for the second spring 7'.

The corrective force generated by the first spring 7 and the second spring 7' satisfies the following: $F_{corr(x)}=F_1(x)+F_2(x)=-F(x,0)$.

According to the state of the art, a spring force is proportional to the linear deformation of the spring. In case of a compression $\delta x[mm]$ of the spring, the following is satisfied: $F=-k\delta x$, wherein $k[N/m]$ is the spring constant.

When the translator movement is divided into n (n=1, 2, 3 . . . ) submovements $[x_{n-1},x_n]$ with $x_0=0$ and $x_N=d$, the spring force can be represented by a linear extrapolation. $F(x)=\alpha_n \times x+\beta_n$ with $$\alpha_n = \frac{F(x_n) - F(x_{n-1})}{x_n - x_{n-1}}$$

and $\beta_n=F(x_{n-1})$.

Consideration of the compression length $\delta_n=x_n-x_{n-1}$ and the spring constant $$k_n = \frac{F(x_n) - F(x_{n-1})}{x_n - x_{n-1}}[N/m],$$

which can both be deducted from the properties of the spring, FIG. 27 is obtained, in which the spring constant is shown for five submovements $x_n \in [0,5,10,20,30,73]$.

The invention claimed is:

1. A magnetic device comprising at least one magnetically excited stator (1) and one magnetically excited translator (2), which translator (2) is movable along a translator movement path (3) in a translator movement direction (4) relative to the stator (1),
   wherein the stator (1) is a permanent magnet and the translator (2) is an electromagnet, or the stator (1) is an electromagnet and the translator (2) is a permanent magnet, or the stator (1) is an electromagnet and the translator (2) is an electromagnet,
   wherein a magnetic force $\vec{F}(x,J)$, x being the distance between stator and translator and J being the current density of the electromagnet, is formed between stator and translator,
   the translator (2) being coupled, at least in portions of the translator movement path (3), to an acceleration unit (5), which on coupling the translator (2) with the acceleration unit (5) generates an acceleration force condition comprising at least a corrective force $F_{corr}$ acting on the translator (2),
   wherein
   when the translator (2) is moved away from the stator (1),
      the sum total of the forces $\vec{F}(x,J)$ acting on the translator (2) in the translator movement direction (4) due to magnetism and $F_{corr}$ of the resulting force profile is greater than or equal to zero,
   so that the translator (2) can be separated from an attractive force $\vec{F}(x,J)$ generated by the stator (1) and the translator (2) acting as one magnet by means of the following corrective force in case of a resulting symmetrical force profile:

$$F_{corr}(x) > -F(x,J=0)$$

$$F_{corr}(x) < -F(x,J=0)$$

$$F_{corr}(x) = -F(x,J=0)$$

or by means of the following corrective force in case of an asymmetrical force profile:

$$F_{corr}(x) < -F(x,|J|>0)$$

$$F_{corr}(x) > -F(x,|J|>0)$$

$$F_{corr}(x) = -F(x,|J|>0).$$

2. The magnetic device according to claim 1, wherein the acceleration unit (5) is coupled the translator (2) along the entire translator movement path (3).

3. The magnetic device according to claim 1, wherein the acceleration unit (5) is, dependent on a distance between the translator (2) and the stator (1), biasable when the translator (2) approaches the stator (1) and/or the acceleration unit (5) causes, dependent on the distance between the translator (2) and the stator (1), the acceleration force condition.

4. The magnetic device according to claim 1, wherein when the translator (2) is coupled to the acceleration unit (5) and when the translator (2) moves towards the stator (1), the sum total of the forces acting on the translator (2) in the direction opposite to the translator movement direction (4) can be smaller than or equal to zero.

5. The magnetic device according to claim 1, wherein the acceleration force condition is equal to a capturing force condition caused by magnetism between the stator (1) and the translator (2).

6. The magnetic device according to claim 1, wherein the acceleration unit (5) is coupled to the translator (2) and a point of reference (6) and extends at least partially between the translator (2) and the point of reference (6).

7. The magnetic device according to claim 1, wherein the stator (1) is the point of reference (6).

8. The magnetic device according to claim 1, wherein the acceleration unit (5) comprises another magnet or a drive unit.

9. The magnetic device according to claim 1, wherein the acceleration unit (5) comprises a spring, which spring has a spring force component acing in parallel with the translator movement direction (4).

10. The magnetic device according to claim 1, wherein the translator movement path (3) is linear or polygonal.

11. The magnetic device according to claim 1, wherein one line of the translator movement path (3) runs through the stator (1).

12. The magnetic device according to claim 11, wherein the stator (1) and the translator (2) are both permanent magnets.

13. The magnetic device according to claim 1, wherein the magnetic device comprises a control device for controlling the polarity of the electromagnet and for controlling the strength of the electromagnet depending on the acceleration force condition.

* * * * *